(12) United States Patent
Enomoto

(10) Patent No.: US 7,393,044 B2
(45) Date of Patent: Jul. 1, 2008

(54) VEHICLE DOOR OPENING AND CLOSING STRUCTURE

(75) Inventor: Takashi Enomoto, Kiryu (JP)

(73) Assignee: Mitsuba Corporation, Gumma (JP)

( * ) Notice: Subject to any disclaimer, the term of this patent is extended or adjusted under 35 U.S.C. 154(b) by 0 days.

(21) Appl. No.: 11/441,939

(22) Filed: May 26, 2006

(65) Prior Publication Data

US 2006/0267375 A1 Nov. 30, 2006

(30) Foreign Application Priority Data

May 31, 2005 (JP) .............................. 2005-159520
Apr. 3, 2006 (JP) .............................. 2006-102480

(51) Int. Cl.
*B60J 5/06* (2006.01)

(52) U.S. Cl. .................... 296/155; 296/146.12; 49/211; 49/212

(58) Field of Classification Search ............ 296/146.11, 296/146.12, 155, 190.11; 49/360, 209, 211, 49/216, 218–220, 223
See application file for complete search history.

(56) References Cited

U.S. PATENT DOCUMENTS

| 3,019,492 | A | * | 2/1962 | Schimek | 49/212 |
| 3,051,999 | A | * | 9/1962 | Schimek | 49/212 |
| 3,501,864 | A | * | 3/1970 | Erb et al. | 49/215 |
| 3,935,674 | A | * | 2/1976 | Williams et al. | 49/212 |
| 4,068,407 | A | * | 1/1978 | Podolan et al. | 49/215 |
| 4,268,996 | A | * | 5/1981 | Allen | 49/212 |
| 4,606,146 | A | * | 8/1986 | Jozefozak | 49/216 |
| 5,507,119 | A | * | 4/1996 | Sumiya et al. | 49/218 |
| 5,921,613 | A | * | 7/1999 | Breunig et al. | 296/155 |
| 6,183,039 | B1 | * | 2/2001 | Kohut et al. | 296/155 |
| 6,248,172 | B1 | * | 6/2001 | Shirotani et al. | 118/500 |
| 6,530,619 | B2 | * | 3/2003 | Fukumoto et al. | 296/155 |
| 6,926,342 | B2 | * | 8/2005 | Pommeret et al. | 296/155 |

FOREIGN PATENT DOCUMENTS

| JP | 10-175444 | 6/1998 |
| JP | 2004-175199 | 6/2004 |
| JP | 2005-153738 | 6/2005 |

\* cited by examiner

*Primary Examiner*—Dennis H. Pedder
*Assistant Examiner*—Mike Hernandez
(74) *Attorney, Agent, or Firm*—McCormick, Paulding & Huber LLP

(57) ABSTRACT

A slider is provided on a rear door so as to be able to freely reciprocated, and the slider is connected to a vehicle body through a control arm and a driven arm. A linear cam groove and a curved cam groove continuous to the linear cam groove are formed in a guide plate fixed to the rear door. A control arm that controls an operation of the rear door includes a proximal portion rotatably attached to the slider and a pair of arm portions continuous to the proximal portion. The longer arm portion is attached to the vehicle body whereas the shorter arm portion is guided by the cam grooves. A projection amount of the rear door can be thereby set larger than a curve amount of the curved cam groove. In addition, a width of the guide plate can be thereby reduced. Therefore, the guide plate can be attached not to the vehicle body but to the rear door.

14 Claims, 20 Drawing Sheets

VEHICLE DOOR OPENING AND CLOSING STRUCTURE

CROSS-REFERENCE TO RELATED APPLICATIONS

Applicant hereby claims foreign priority benefits under U.S.C. § 119 from Japanese Patent Applications No. 2005-159520 filed on May 31, 2005 and No. 2006-102480 filed on Apr. 3, 2006, the contents of which are incorporated by reference herein.

BACKGROUND OF THE INVENTION

1. Field of the Invention

The present invention relates to a vehicle door opening and closing structure for opening or closing a door main body attached to an opening of a vehicle body.

2. Description of the Related Art

As an opening and closing structure for each door for ingress and egress provided on a vehicle, there are known a swing opening and closing structure for swinging the door through a hinge and a slide opening and closing structure for sliding the door along a side surface of a vehicle body. If the swing opening and closing structure is adopted, the number of parts can be reduced and a vehicle structure can be simplified. However, this structure makes it disadvantageously difficult to open and close the door in a tiny parking lot. If the slide opening and closing structure is adopted, a projection amount of the door can be suppressed. This structure can, therefore, facilitate opening and closing the door even in a tiny parking lot.

In this slide opening and closing structure, a guide rail including a linear portion and a curved portion is incorporated into a vehicle side portion, and a slide door is guided along this guide rail in an opening or closing direction. To open the slide door, the slide door is projected in a vehicle exterior direction along the curved portion of the guide rail, and then the slide door is slidably moved to a fully opened position. Conversely, to close the slide door, the slide door is moved to the curved portion along the linear portion of the guide rail, and then the slide door is pulled inward in a vehicle interior direction along the curved portion. However, in the opening and closing structure in which the slide door is projected or pulled inward by guiding the door along the curved portion of the guide rail, a moving locus of the slide door coincides with a curved shape of the guide rail. Due to this, it is necessary to curve the guide rail greatly according to the projection amount (pulling amount) required for the slide door. The guide rail of this type disadvantageously influences a vehicle structure.

To solve the disadvantages, an opening and closing structure in which a swing mechanism for moving the slide door in a vehicle width direction and a slide mechanism for moving the slide door in a vehicle longitudinal direction are provided separately is developed. This opening and closing structure can suppress an influence of the guide rail on the vehicle body structure since it is unnecessary to provide the guide rail with the curved portion. Further, an opening and closing structure in which a guide rail and a slide door are connected to each other through a bell crank is developed. This opening and closing structure can amplify the pulling amount of the slide door through the bell crank. A curve amount of the guide rail can be, therefore, reduced.

However, the opening and closing structure having the swing mechanism and the slide mechanism provided separately has the following disadvantages. To actuate one of the two mechanisms, the other mechanism needs to be locked. Due to this, an opening and closing operation for the slide door becomes a stepped operation. This makes it disadvantageously difficult to smoothly open and close the slide door. As a result a good operativity cannot be ensured, resulting in degradation in a vehicle quality. Furthermore, if the door opening and closing operation is to be automated by incorporating an electric motor into this opening and closing structure, it is necessary to incorporate the electric motor into each of the swing mechanism and the slide mechanism. This disadvantageously complicates the opening and closing structure and increases manufacturing cost.

The opening and closing structure having the guide rail connected to the slide door through the bell crank has the following disadvantages. Although this structure can smoothly open and close the slide door, the vehicle looks less attractive for the following reasons. The guide rail is incorporated not only into a side sill of the vehicle body but also into the vehicle side surface. Furthermore, since a driving unit as well as the guide rail is incorporated into the side sill, a height of the side sill is increased. This may possibly deteriorate an ingress and egress performance of the vehicle.

SUMMARY OF THE INVENTION

It is an object of the present invention to improve an operativity and a vehicle quality by smoothly opening and closing a door main body.

It is an object of the present invention to facilitate automation of an opening and closing operation for the door main body.

It is an object of the present invention to improve an outward appearance of the vehicle and an ingress and egress performance of the vehicle by assembling a guide member into the door main body.

A vehicle door opening and closing structure according to the present invention is one for opening and closing a door main body attached to an opening of a vehicle body, comprising: a slide rail fixed to the door main body; a slider attached to the slide rail to be movable along the slide rail; a control arm including a proximal portion rotatably connected to the slider and a pair of arm portions continuous to the proximal portion; a driven arm having one end rotatably connected to the vehicle body and having the other end rotatably connected to the slider; and a guide member including a linear portion and a curved portion continuous to the linear portion, the guide member fixed to the door main body and movably engaged with one of the arm portions of the control arm, wherein the control arm is rotated by moving the slider along the slide rail, and the door main body is pulled outside of the vehicle body by the other arm portion, and then the slider is moved along the slide rail, thereby slidably opening and closing the door main body.

The vehicle door opening and closing structure according to the present invention is characterized in that the other arm portion of the control arm is rotatably connected to the vehicle body.

The vehicle door opening and closing structure according to the present invention is characterized in that the other arm portion of the control arm and the driven arm are arranged in parallel to each other.

The vehicle door opening and closing structure according to the present invention is characterized in that the other arm portion is longer than the arm portion movably engaged with the guide member.

The vehicle door opening and closing structure according to the present invention is further comprised of a base member connected to the vehicle body through a hinge member, and connected to the door main body through the driven arm; and a lock mechanism provided between the vehicle body and the base member, and switched over between a fastened state in which the base member is fixed to the vehicle body and a released state in which the base member is separated from the vehicle body, wherein the door main body is slidably moved along a side surface of the vehicle body by fastening the lock mechanism to thereby fix the base member to the vehicle body, and the door main body is swung and moved with the hinge member set as a fulcrum by releasing the lock mechanism to thereby separate the base member from the vehicle body.

The vehicle door opening and closing structure according to the present invention is characterized in that the base member is connected to the door main body through the control arm and the driven arm.

The vehicle door opening and closing structure according to the present invention is further comprised of a sub control arm rotatably connected to the other arm portion of the control arm, and rotatably connected to an intermediate portion of the driven arm.

The vehicle door opening and closing structure according to the present invention is characterized in that the driven arm is a pair of driven arms.

The vehicle door opening and closing structure according to the present invention is characterized in that the pair of arm portions are formed to be substantially equal in length, and the control arm is formed into a doglegged shape.

The vehicle door opening and closing structure according to the present invention is further comprised of a base member connected to the vehicle body through a hinge member, and connected to the door main body through the driven arm; and a lock mechanism provided between the vehicle body and the base member, and switched over between a fastened state in which the base member is fixed to the vehicle body and a released state in which the base member is separated from the vehicle body, wherein the door main body is slidably moved along a side surface of the vehicle body by fastening the lock mechanism to thereby fix the base member to the vehicle body, and the door main body is swung and moved with the hinge member set as a fulcrum by releasing the lock mechanism to thereby separate the base member from the vehicle body.

The vehicle door opening and closing structure according to the present invention is characterized in that the base member is connected to the door main body through a pair of the driven arms.

The vehicle door opening and closing structure according to the present invention is characterized in that the slider is driven by driving means fixed to the door main body.

The vehicle door opening and closing structure according to the present invention is characterized in that the curved portion of the guide member is curved in a vehicle exterior direction or a vehicle interior direction on an opened side of the door main body in a slidably moving direction of the door main body.

According to the present invention, the guide member that includes the linear portion and the curved portion is fixed to the door main body, the control arm is rotated by this guide member, and the opening and closing operation for the door main body is controlled by rotation of the control arm. Therefore, the door main body can be smoothly opened and closed between the fully closed position and the fully opened position. It is thereby possible to improve the operativity during the opening and closing operation, and improve the vehicle quality.

According to the present invention, the door main body can be opened and closed by moving the slider along the slide rail. Therefore, it is possible to automate the opening and closing operation for the door main body by providing driving means for driving the slider. It is, therefore, unnecessary to provide a plurality of actuators and a complicated power transmission mechanism, and possible to facilitate automation of opening and closing the door main body.

Furthermore, according to the present invention, the shorter arm portion is engaged with the guide member whereas the longer arm portion is connected to the vehicle side. It is, therefore, possible to suppress a curve amount of the curved portion and reduce a size of the guide member. This enables the guide member to be attached to the door main body. It is thereby possible to enhance the outward appearance of the vehicle and improve the ingress and egress performance of the vehicle.

DESCRIPTION OF THE PREFERRED EMBODIMENTS

Embodiments of the present invention will be described hereinafter in detail with reference to the accompanying drawings.

Figure 1:
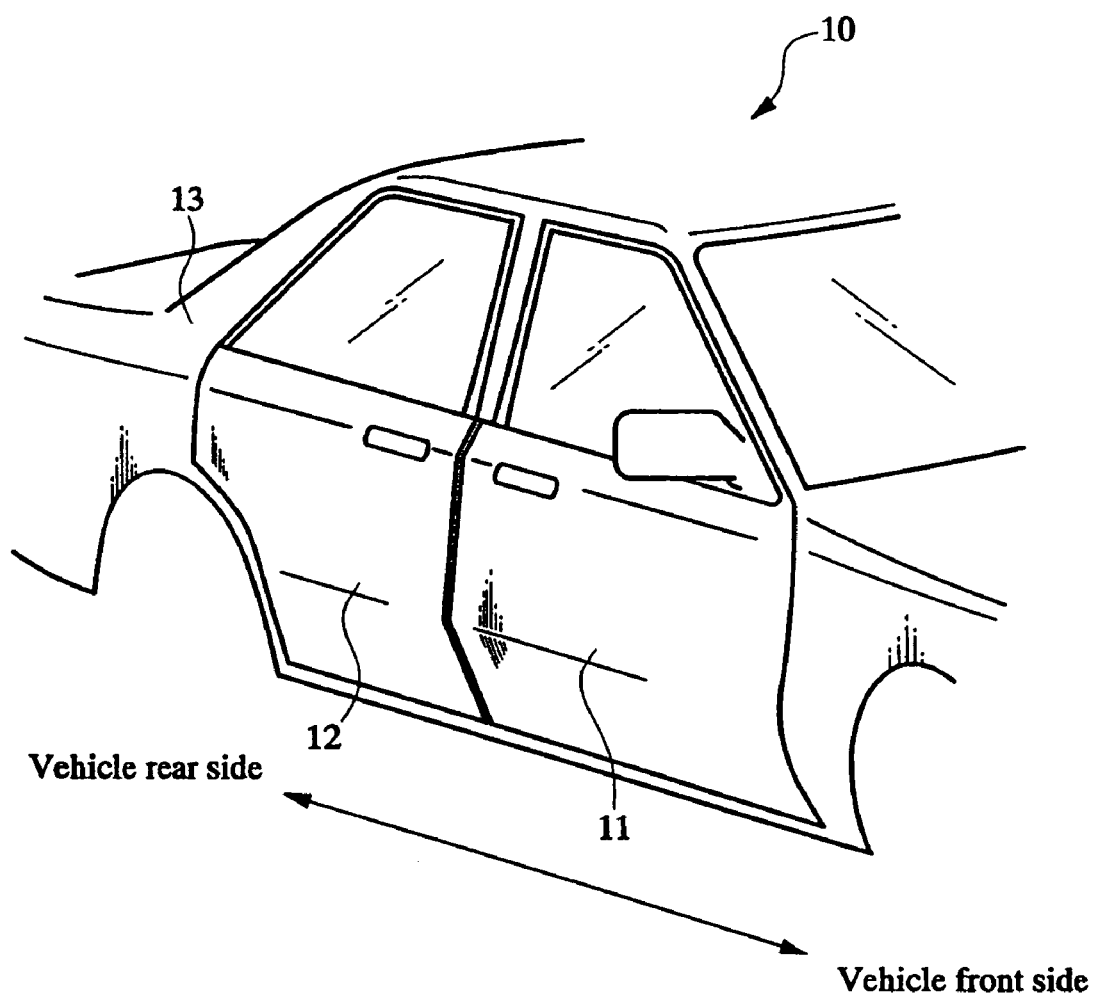
FIG. 1 is a perspective view of a vehicle into which a vehicle door opening and closing structure according to one embodiment of the present invention is incorporated.

As shown in FIG. 1, a front door 11 (door main body) for opening and closing an ingress and egress portion (opening) of a driver's seat or a passenger's seat and a rear door 12 (door main body) for opening and closing an ingress and egress portion (opening) of a rear seat are provided on a side portion of a vehicle. An opening and closing structure for the front door 11 can be switched over between a slide type for slidably moving the front door 11 in a vehicle front direction, and a swing type for swinging the front door 11 about a front end of the front door 11 as a fulcrum. An opening and closing structure for the rear door 12 is simply a slide opening and closing structure for slidably moving the rear door 12 in a vehicle rear direction.

Figure 2:
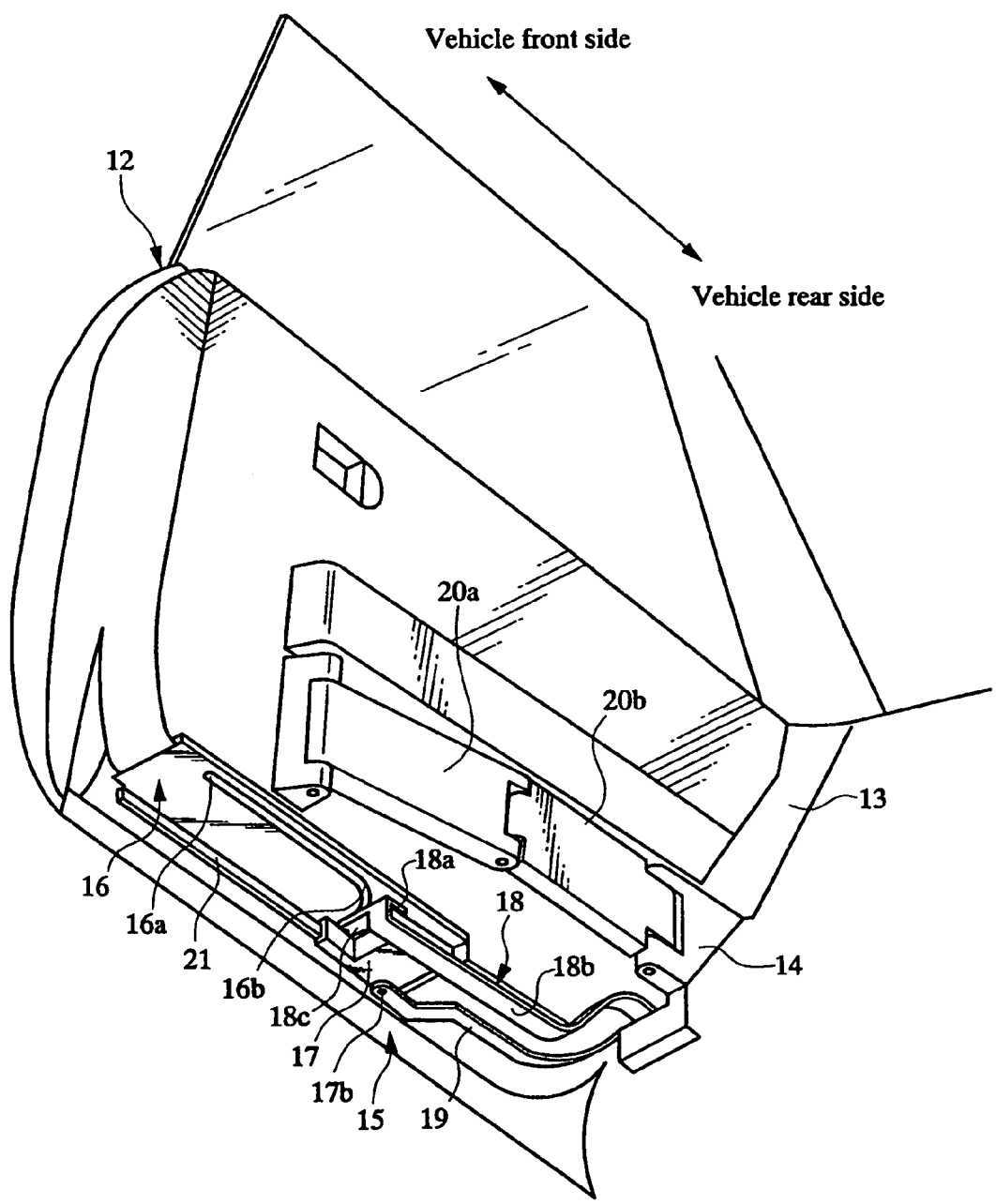
FIG. 2 is a perspective view of the opening and closing structure from below a rear door according to the embodiment.

As shown in FIG. 2, a support block 14 that supports the rear door 12 is fixed to a vehicle body 13. The rear door 12 is connected to the support block 14 through a link mechanism 15 provided in a lower portion of the rear door 12. The link mechanism 15 controls an opening and closing operation for the rear door 12. The link mechanism 15 includes a guide plate 16 fixed to a lower surface of the rear door 12 and serving as a guide member, and a slider 17 reciprocated on the guide plate 16. This slider 17 is connected to the support block 14 through a control arm 18 and a driven arm 19. In addition, the rear door 12 is connected to the support block 14 through support arms 20a and 20b, and the support arms 20a and 20b support a weight of the rear door 12.

The link mechanism 15 that controls the opening and closing operation for the rear door 12 will next be described.

Figure 3:
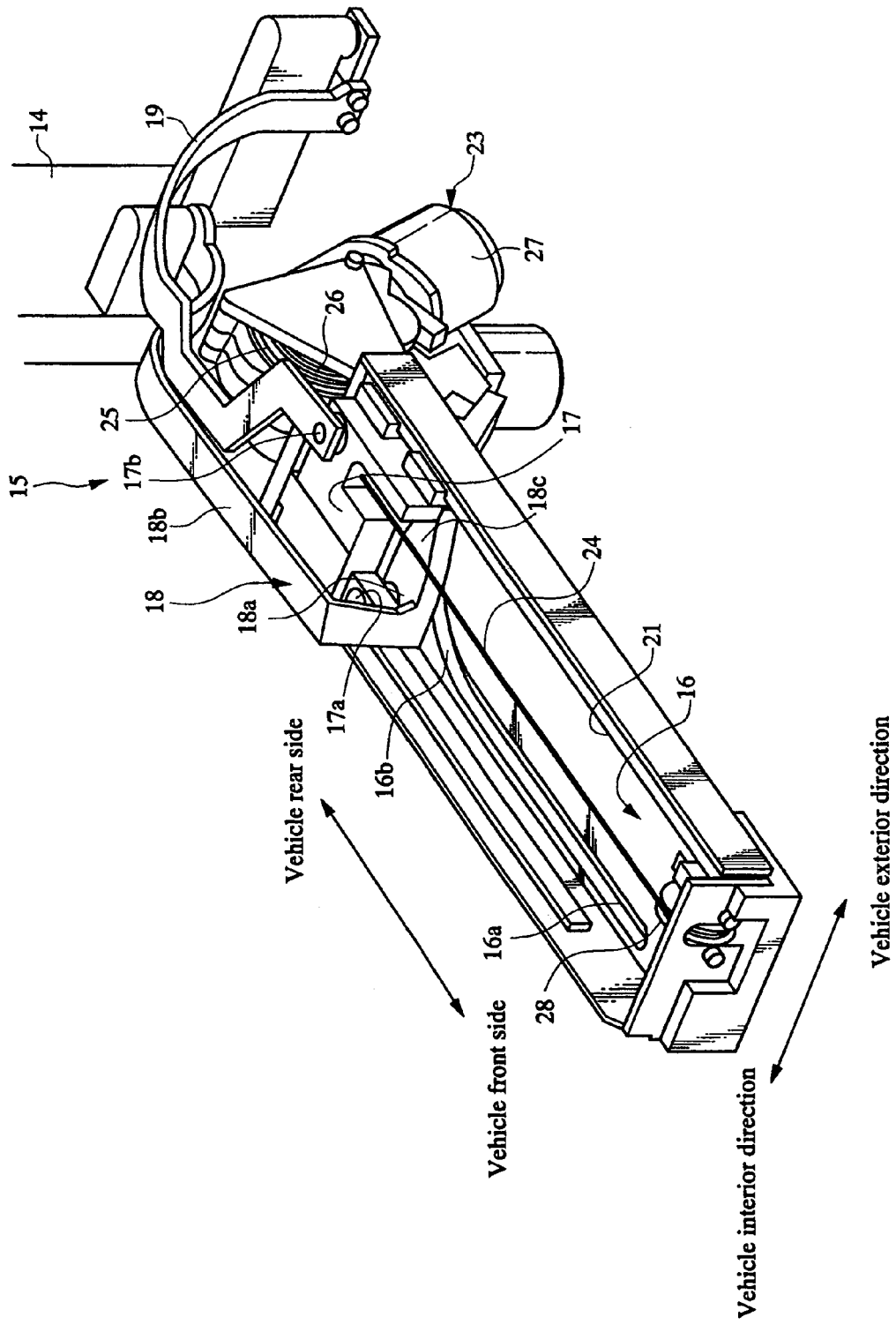
FIG. 3 is a perspective view of a link mechanism according to the embodiment.
Figure 4:
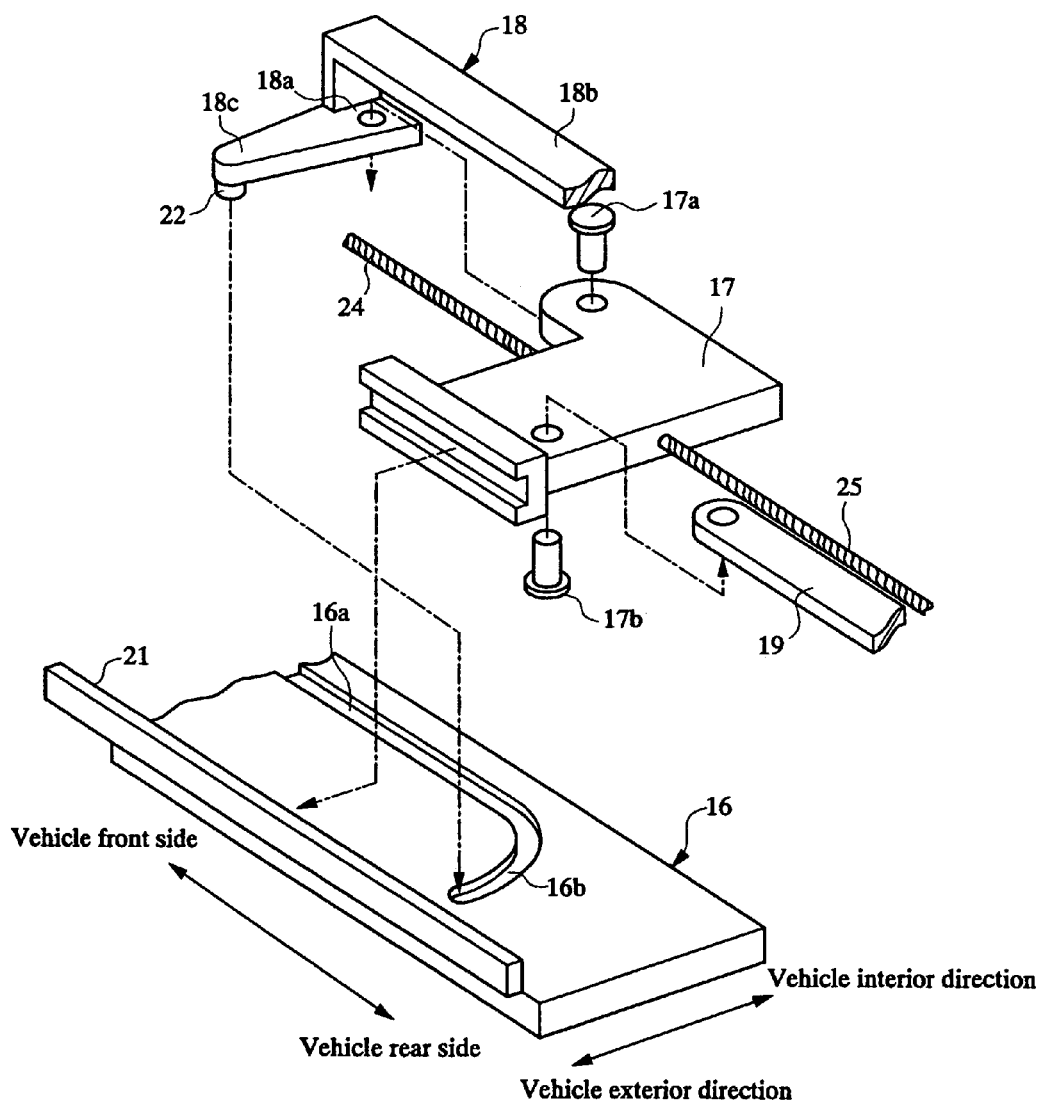
FIG. 4 is an exploded perspective view of a slider that constitutes the link mechanism and elements in the neighborhood of the slider according to the embodiment.

FIG. 3 is a perspective view of the link mechanism 15. FIG. 4 is an exploded perspective view of the slider 17 that constitutes the link mechanism 15 and elements in the neighborhood of the slider 17. In FIGS. 3 and 4, the link mechanism 15 is shown in a vertically inverted state.

As shown in FIGS. 3 and 4, a cam groove 16a serving as a linear portion that extends in a vehicle longitudinal direction of the vehicle 10 is formed in the guide plate 16 fixed to the lower surface of the rear door 12. In addition, a cam groove 16b serving as a curved portion continuous to the cam groove 16a is formed in the guide plate 16 so as to be curved in the vehicle exterior direction on an opening side of the rear door 12 in a slidably moving direction thereof. Further, a slide rail 21 parallel to the cam groove 16a of the guide plate 16 is fixed to the rear door 12. The slider 17 is attached to this slide rail 21 so that the slider 17 can be moved (freely reciprocated) along the slide rail 21.

As shown in FIG. 3, the control arm 18 includes a proximal portion 18a rotatably attached to the slider 17 by a pivotal pin 17a, and a pair of arm portions 18b and 18c continuous to this proximal portion 18a. The arm portions 18b and 18c different in length are connected to each other in a generally L shape through the proximal portion 18a. The longer arm portion 18b is rotatably attached to the support block 14 of the vehicle body 13 whereas the shorter arm portion 18c is guided by the cam grooves 16a and 16b of the guide plate 16. One end of the driven arm 19 is rotatably attached to the support block 14 whereas the other end of the driven arm 19 is rotatably attached to the slider 17 by a pivotal pin 17b. The driven arm 19 is arranged in parallel to the arm portion 18b of the control arm 18. A parallel link is formed by this driven arm 19 and the control arm 18. As shown in FIG. 4, an engagement pin 22 is formed on a tip end of the arm portion 18c that constitutes the control arm 18. This engagement pin 22 is movably engaged with the cam grooves 16a and 16b of the guide plate 16.

As shown in FIG. 3, a pair of cables 24 and 25 extending from a slide actuator (driving unit) 23 are fixed to the slider 17 to which the control arm 18 and the driven arm 19 are attached. The slide actuator 23 fixed to the rear door 12 and functioning as the driving unit includes a cable drum 26 around which the cables 24 and 25 are wound by a plurality of turns, and an electric motor 27 that drives this cable drum 26. The cable 24, which is an opening-side cable, and the cable 25, which is a closing-side cable, are wound around the cable drum 26 in opposite directions. The closing-side cable 25 is fixed to the slider 17 from a vehicle rear side whereas the opening-side cable 24 is fixed to the slider 17 from a vehicle front side through a reverse pulley 28 fixed to the rear door 12.

Figure 5A:
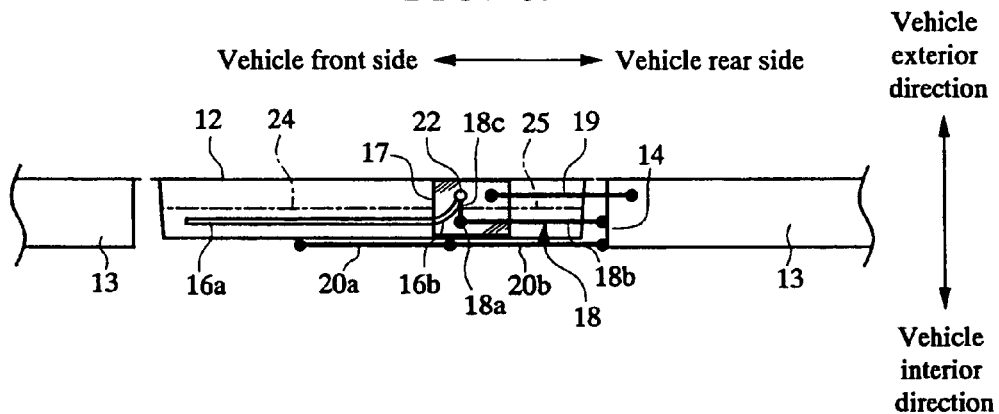
FIGS. 5A to 5C are explanatory views of a rear door opening and closing operation according to the embodiment.
Figure 5B:
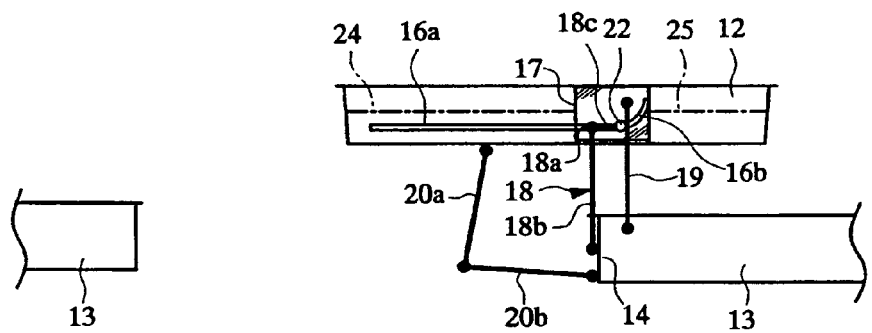
Figure 5C:
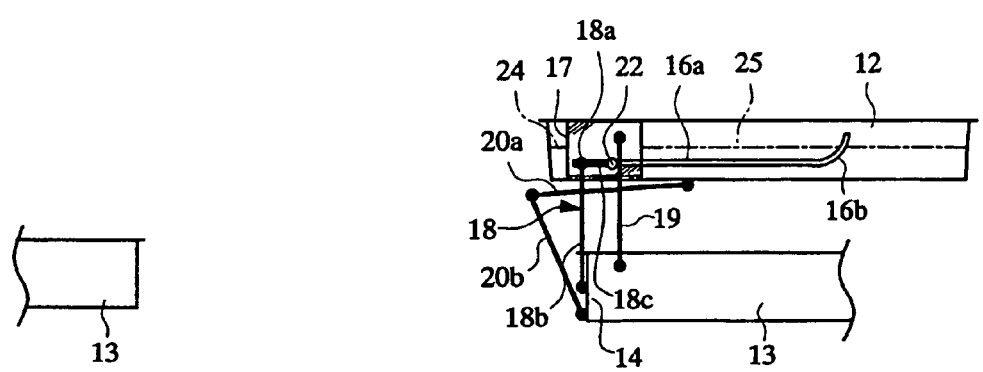
Figure 6A:
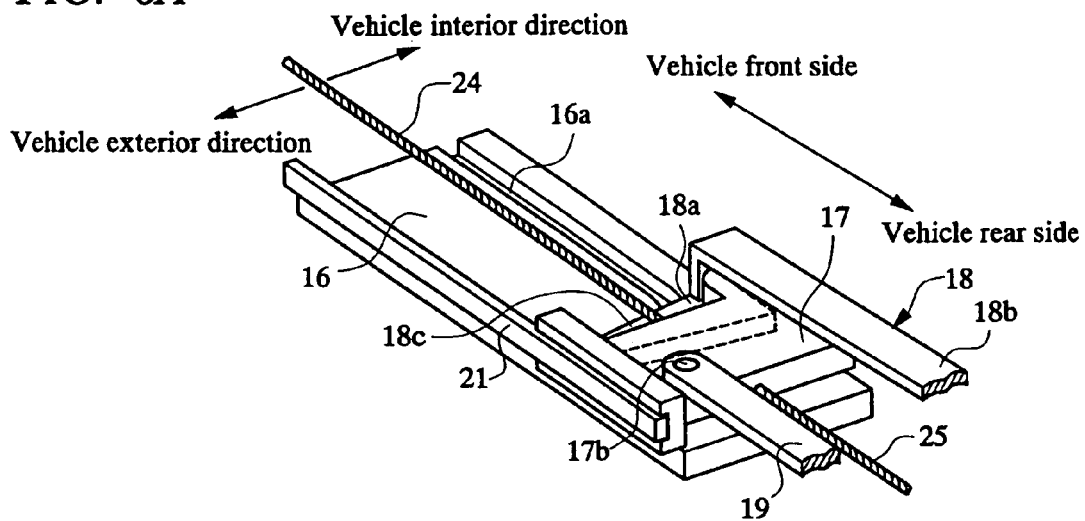
FIGS. 6A to 6C are perspective views of the link mechanism provided at the rear door in an operating state according to the embodiment.
Figure 6B:
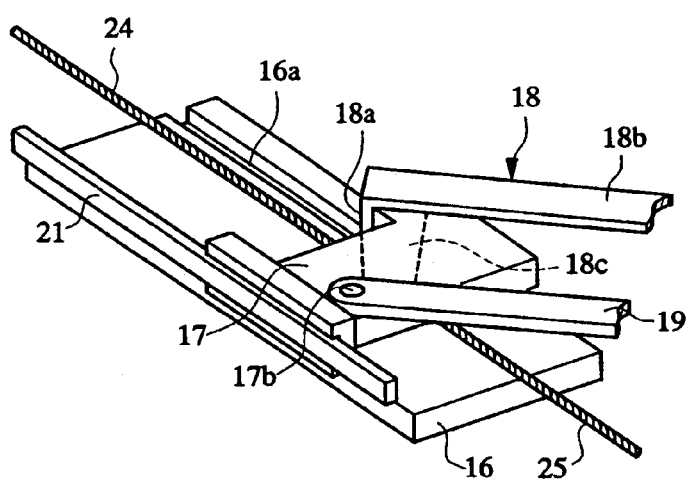
Figure 6C:
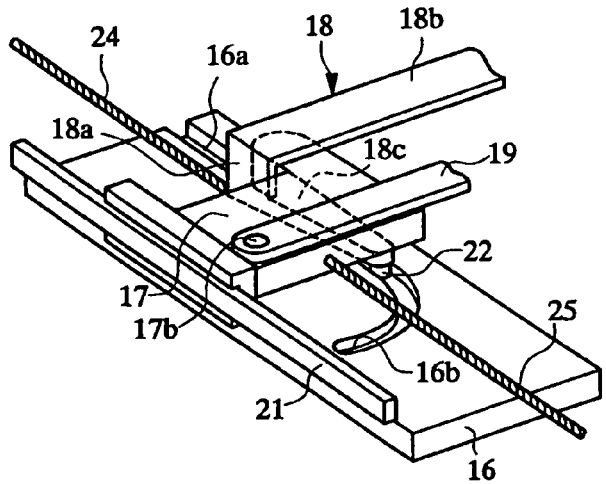
Figure 7A:
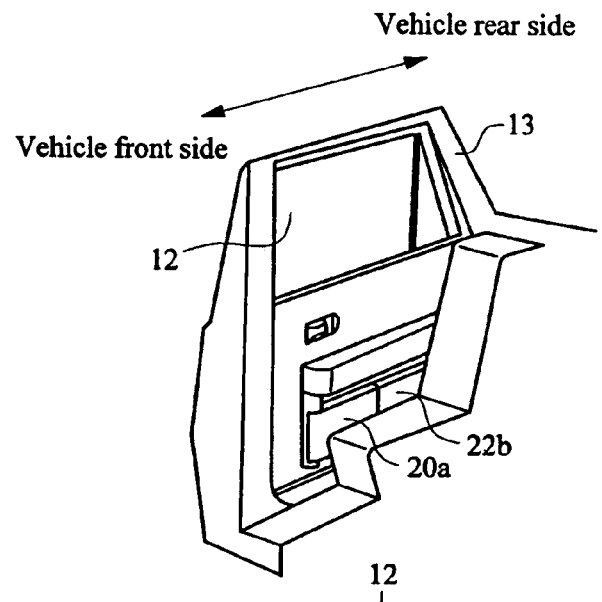
FIGS. 7A to 7C are perspective views of the rear door, showing the rear door opening and closing operation from a vehicle interior side according to the embodiment.
Figure 7B:
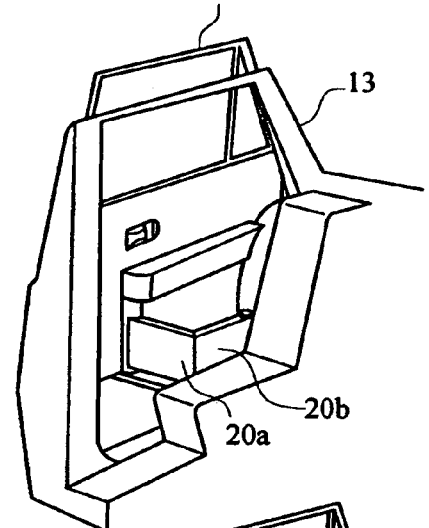
Figure 7C:
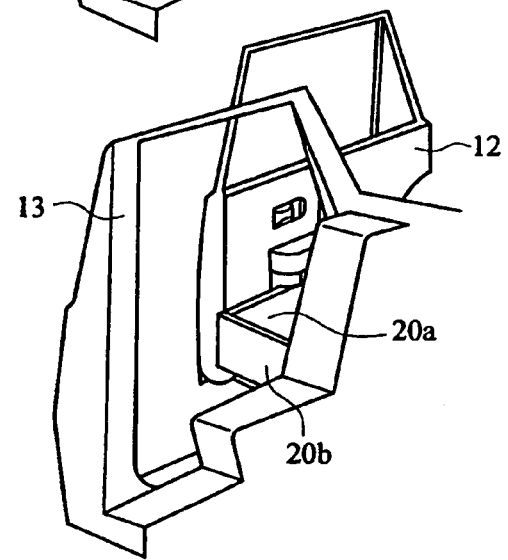
Figure 8A:
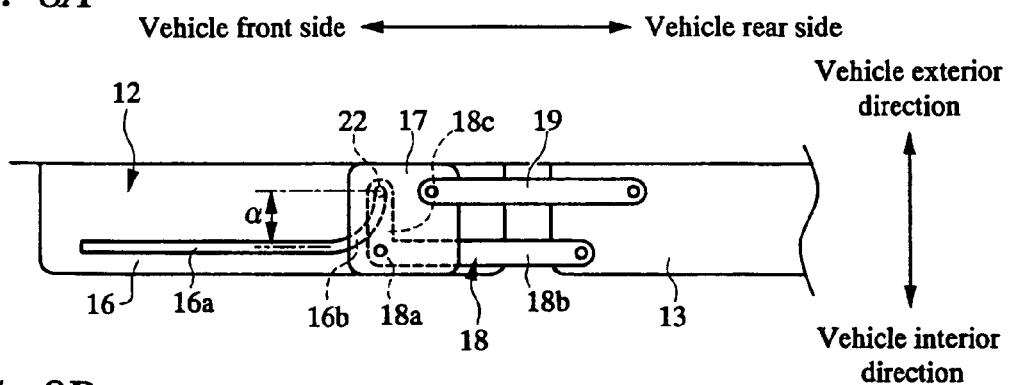
FIGS. 8A to 8D are explanatory views of the rear door opening and closing operation according to the embodiment.
Figure 8B:
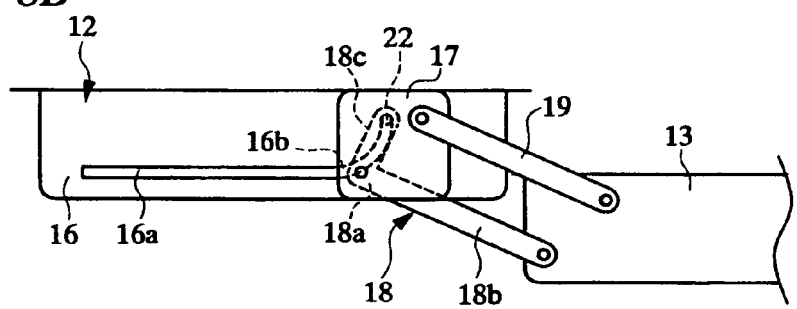
Figure 8C:
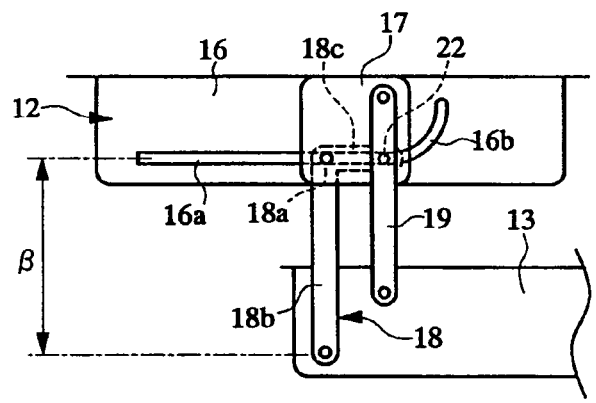
Figure 8D:
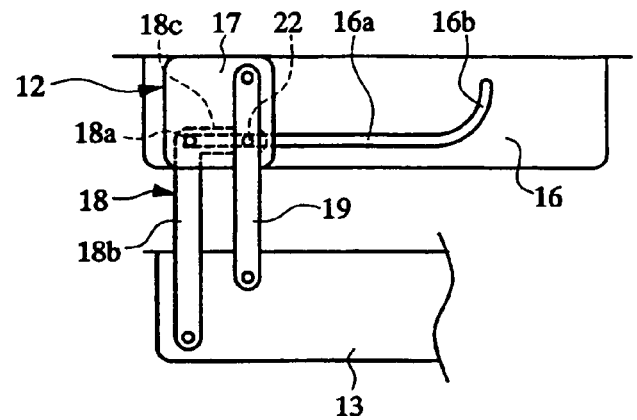

If one of the opening-side cable 24 and the closing-side cable 25 is fed forward and the other cable is pulled inward by driving the slide actuator 23 thus configured, the rear door 12 can be moved relative to the slider 17. Namely, the slide actuator 23 is fixed to the rear door 12. Due to this, if the slider 17 is separated from the slide actuator 23 by pulling the opening-side cable 24 inward, the rear door 12 can be moved in the vehicle rear direction relative to the slider 17. If the slider 17 is made closer to the slide actuator 23 by pulling the closing-side cable 25 inward, the rear door 12 can be moved in the vehicle front side relative to the slider 17. The slide actuator 23 includes a control unit (not shown) that includes a CPU and a memory. Therefore, the slide actuator 23 executes a current-carrying control over the electric motor 27 in response to an operation signal from an opening-closing switch (not shown) provided at for example, a driver's seat or a rear seat The opening and closing operation for the rear door 12 will next be described. FIGS. 5A to 5C are explanatory views of the opening and closing operation for the rear door 12. Specifically, FIG. 5A shows a state in which the slide door 12 is closed up to a fully closed position, and FIG. 5C shows a state in which the rear door 12 is opened up to a fully opened position. FIGS. 6A to 6C are perspective views of the link mechanism 15 provided at the rear door 12 in an operating state. Specifically, FIG. 6A shows a state in which the rear door 12 is pulled inward in the vehicle interior direction, and FIG. 6C shows a state in which the rear door 12 is projected in the vehicle exterior direction. FIGS. 7A to 7C are perspective views of the rear door 12, showing the opening and closing operation of the rear door 12 from a vehicle interior side. Specifically, FIG. 7A shows a state in which the rear door 12 is closed up to the fully closed position, and FIG. 7C shows a state in which the rear door 12 is opened up to the fully opened position.

First as shown in FIG. 5A, in the state in which the rear door 12 is fully closed, the rear door 12 is moved in the vehicle front direction to follow pulling inward of the closing-side cable 25, and the engagement pin 22 of the arm portion 18c is moved to a tip end of the cam groove 16b. If the opening-side cable 24 is pulled inward by driving the slide actuator 23 from this fully closed state, the guide plate 16 integral with the rear door 12 is moved in the vehicle rear direction as shown in FIGS. 6A to 6C. Accordingly, the control arm 18 attached to the slider 17 is rotated according to the cam groove 16b. In this case, the control arm 18 is rotated, with the proximal portion 18a set as a fulcrum. Since the arm portion 18b of the control arm 18 is attached to the support block 14 of the vehicle body 13, the control arm 18 is rotated with an end of the arm portion 18c set as a fulcrum, while the rear door 12 is projected in the vehicle exterior direction as shown in FIGS. 5A and 5B. If the slide actuator 23 is further driven to pull the opening-side cable 24 inward from a half-opened state shown in FIG. 5B, the engagement pin 9 of the arm portion 18c is moved along the linear cam groove 16a as shown in FIG. 5C. Therefore, the rear door 12 can be slidably moved to the fully opened position along the side surface of the vehicle body 13. It is noted that an angle of the rear door 12 is kept constant when the rear door 12 is projected since the parallel link is formed by the control arm 18 and the driven arm 19. In addition, as shown in FIGS. 5A to 5C and 7A to 7C, the support arms 20a and 20b that support the weight of the rear door 12 follow the opening and closing operation for the rear door 12 without hampering the operation.

As stated so far, if the control arm 18 is rotated by pulling the closing-side cable 25 inward using the slide actuator 23 to move the slider 17 along the slide rail 21, then the rear door 12 can be pulled out to the outside of the vehicle body 13 and slidably opened and closed. It is thereby possible to smoothly open the rear door 12 from the fully closed position to the fully opened position. In addition, if a rotation direction of the cable drum 26 is inverted to pull the opening-side cable 24 inward, the rear door 12 can be smoothly closed from the fully closed position to the fully opened position as shown in FIGS. 5C, 5B, and 5A in this order.

By thus adopting the opening and closing structure according to the embodiment of the present invention, the opening and closing operation for the rear door 12 can be continuously performed without intermissions. Therefore, the operativity of the door during the opening and closing operation can be improved, the vehicle quality can be enhanced, and the automation of the opening and closing operation for the rear door 12 can be facilitated. In other words, only by moving the slider 17 and the rear door 12 relative to each other, the rear door 12 can be opened and closed. Therefore, the opening and closing operation can be automated without the need to provide a plurality of actuators and a complicated power transmission mechanism.

FIGS. 8A to 8D are explanatory views of the opening and closing operation for the rear door 12. To facilitate understanding the opening and closing operation, FIGS. 8A to 8D are depicted in simpler form than FIGS. 5A to 5C. As shown in FIGS. 8A to 8D, the shorter arm portion 18c is moved along the cam grooves 16a and 16b whereas the longer arm portion 18b is attached to the vehicle body 13. It is, therefore, possible to amplify a rotation amount of the arm portion 18c and transmit the rotation of the arm portion 18c to the arm portion 18b. Namely, a projection amount β of the rear door 12 can be set larger than a curve amount a of the cam groove 16b. A width of the guide plate 16 can be, therefore, set small while securing the same projection amount β as that according to the conventional technique. This enables the guide plate 16 to be attached to the narrow lower surface of the rear door 12. Therefore, it is unnecessary to attach the guide plate 16 and the like to the side sill of the vehicle body 13. In addition, it is possible to improve the outward appearance of the vehicle 10, suppress a height of the side sill, and improve the ingress and egress performance.

Figure 9:
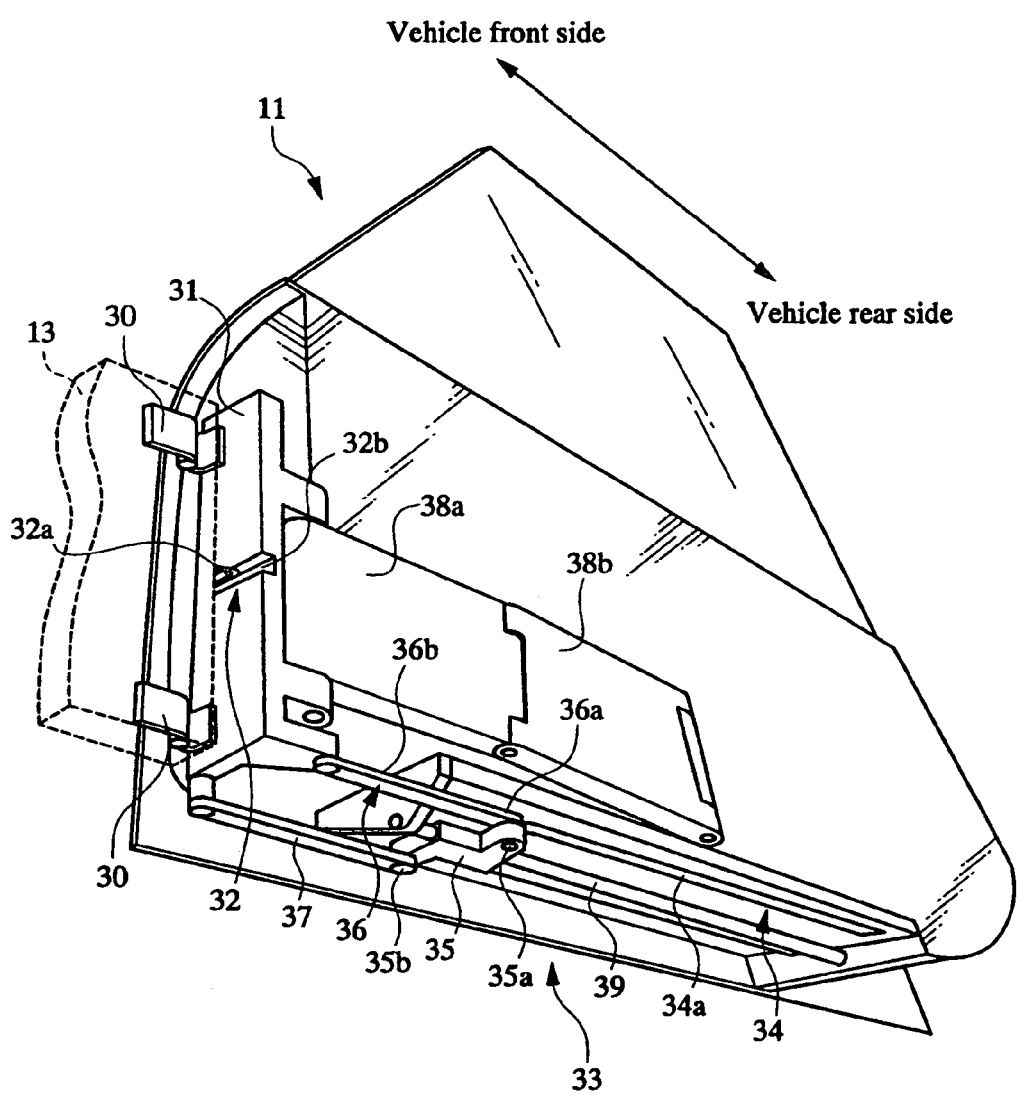
FIG. 9 is a perspective view of the front door opening and closing structure from below a front door.

Next an opening and closing structure for the front door 11 will be described. FIG. 9 is a perspective view of the opening and closing structure for the front door 11 from below the front door 11. As shown in FIG. 9, a base member 31 is attached to the vehicle body 13 through a hinge member 30. A lock mechanism 32 is provided between the vehicle body 13 and the base member 31. The lock mechanism 32 includes a striker 32a provided at the vehicle body 13 and a lock assembly 32b provided at the base member 31. By mating the lock assembly 32b with the striker 32a, the vehicle body 13 and the base member 31 can be integrally fixed to each other. The base member 31 fixed to the vehicle body 13 through this lock mechanism 32 is connected to the front door 11 supported by this base member 31 through a link mechanism 33 provided in a lower portion of the front door 11. The link mechanism 33 that controls an opening and closing operation for the front door 11 includes a guide plate 34 fixed to a lower surface of the front door 11 and serving as a guide member, and a slider 35 that is reciprocated on the guide plate 34. The slider 35 is connected to the base member 31 through a control arm 36 and a driven arm 37. The front door 11 is connected to the base member 31 through support arms 38a and 38b, and the support arms 38a and 38b support a weight of the front door 11.

Figure 10:
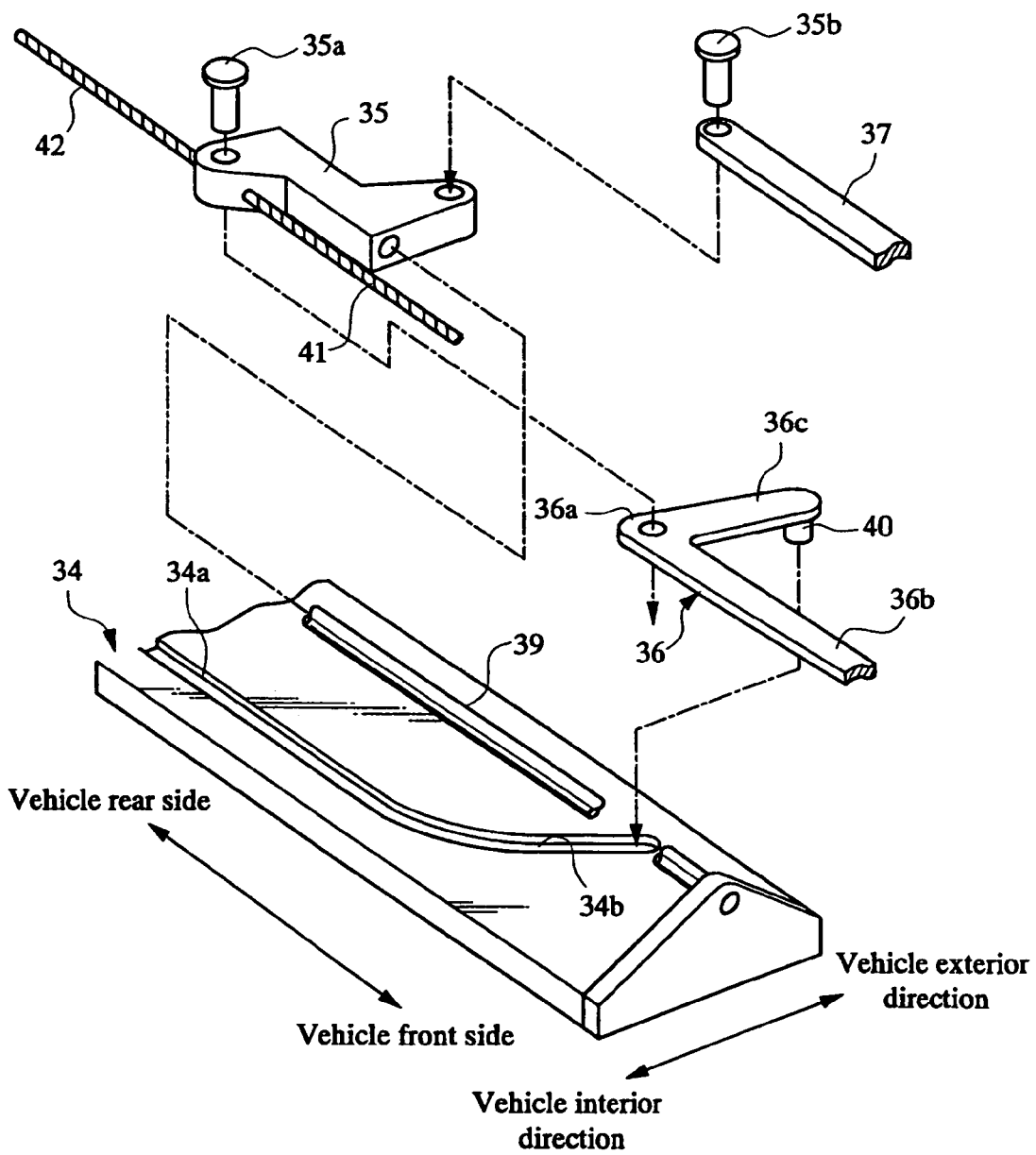
FIG. 10 is an exploded perspective view of a slider that constitutes the link mechanism and elements in the neighborhood of the slider according to the embodiment.

FIG. 10 is an exploded perspective view of the slider 35 that constitutes the link mechanism 33 and elements in the neighborhood of the slider 35. In FIG. 10, the link mechanism 33 is shown in a vertically inverted state. As shown in FIG. 10, a cam groove 34a serving as a linear portion extending in the vehicle longitudinal direction is formed in the guide plate 34 fixed to the front door 11. In addition, a cam groove 34b serving as a curved portion continuous to the cam groove 34a is formed in the guide plate 34 so as to be curved in the vehicle exterior direction. Further, a slide rail 39 parallel to the cam groove 34a is fixed to the guide plate 34, and the slider 35 is attached to this slide rail 39 so as to be able to be reciprocated.

The control arm 36 includes a proximal portion 36a rotatably attached to the slider 35, and a pair of arm portions 36b and 36c continuous to this proximal portion 36a. The arm portions 36b and 36c different in length are connected to each other in a generally L shape through the proximal portion 36a. The longer arm portion 36b is rotatably attached to the vehicle body 13-side base member 31 by a pivotal pin 35b whereas the shorter arm portion 36c is guided by the cam grooves 34a and 34b of the guide plate 34. One end of the driven arm 37 is rotatably attached to the base member 31 whereas the other end of the driven arm 37 is rotatably attached to the slider 35 by a pivotal pin 35b. This driven arm 37 and the control arm 36 form a parallel link. An engagement pin 40 is formed on a tip end of the arm portion 36c that constitutes the control arm 36. This engagement pin 40 is movably engaged with the cam grooves 34a and 34b of the guide plate 34.

A closing-side cable 41 is fixed to the slider 35, to which the control arm 36 and the driven arm 37 are attached, from the vehicle front side whereas an opening-side cable 42 is fixed to the slider 35 from the vehicle rear side. A slide actuator (not shown), equal in configuration to the slide actuator 23, is fixed to the front door 11. This slide actuator can pull the opening-side cable 42 and the closing-side cable 42 inward.

The opening and closing operation for the front door 11 will next be described. As already stated, the opening and closing structure for the front door 11 can be switched over between the slide type and the swing type. This switchover is controlled by the lock mechanism 32 provided between the vehicle body 13 and the base member 31. Namely, the opening and closing structure is set to the slide opening and closing structure by switching over a state of the lock mechanism 32 to a fastened state. In addition, the opening and closing structure is set to the swing opening and closing structure by switching over the state of the lock mechanism 32 to a released state.

Figure 11A:
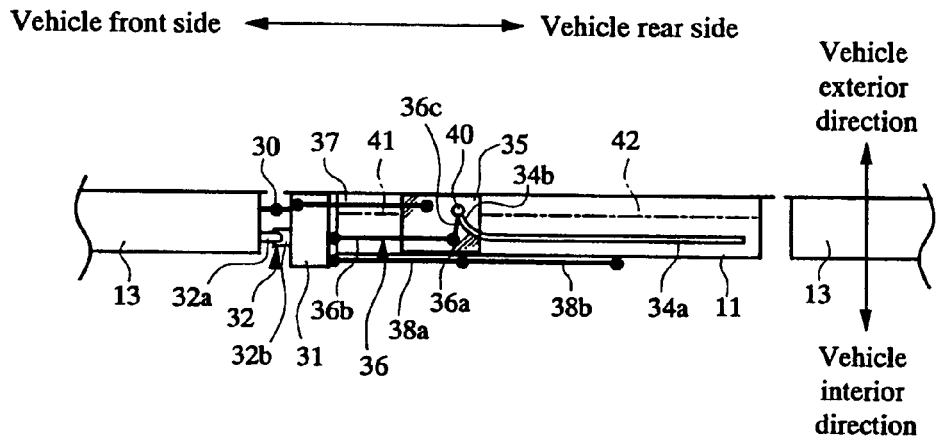
FIGS. 11A to 11C are explanatory views of a front door opening and closing operation, with the structure set to a slide opening and closing structure according to the embodiment.
Figure 11B:
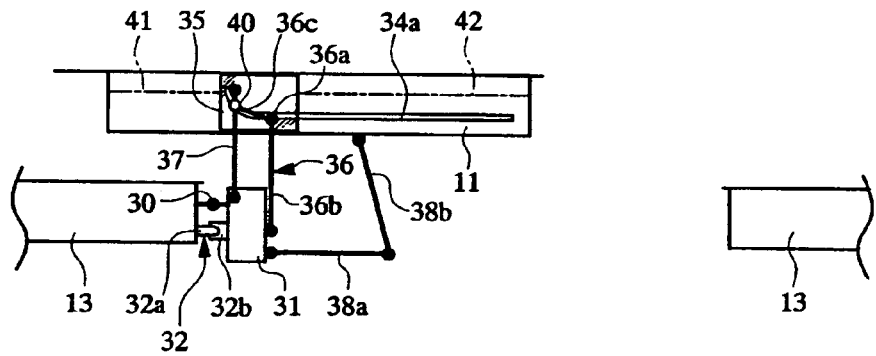
Figure 11C:
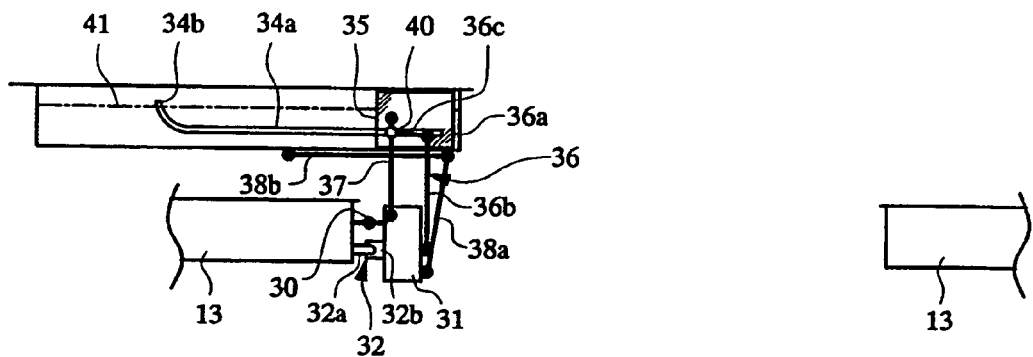
Figure 12A:
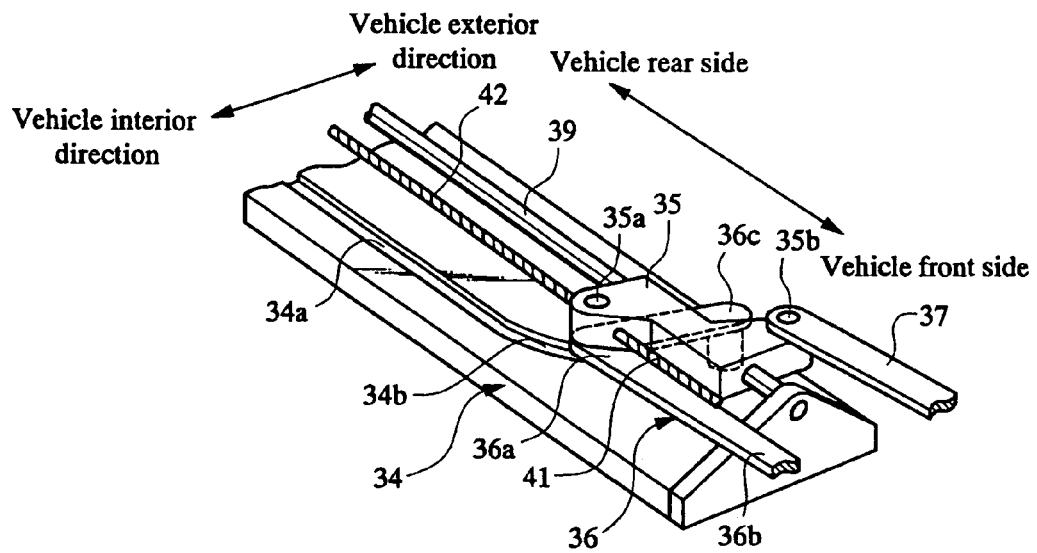
FIGS. 12A to 12C are perspective views of a link mechanism set to the slide opening and closing operation in an operating state according to the embodiment.
Figure 12B:
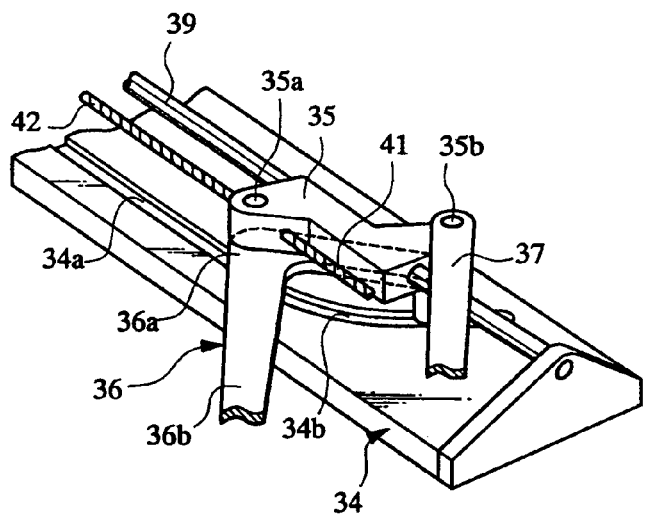
Figure 12C:
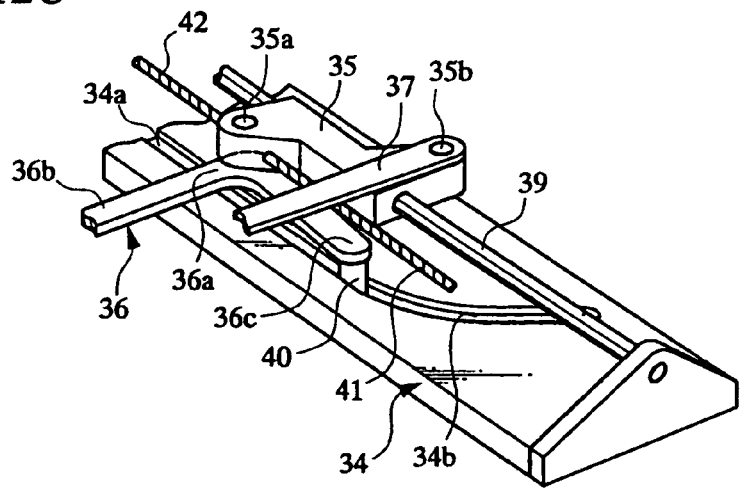
Figure 13A:
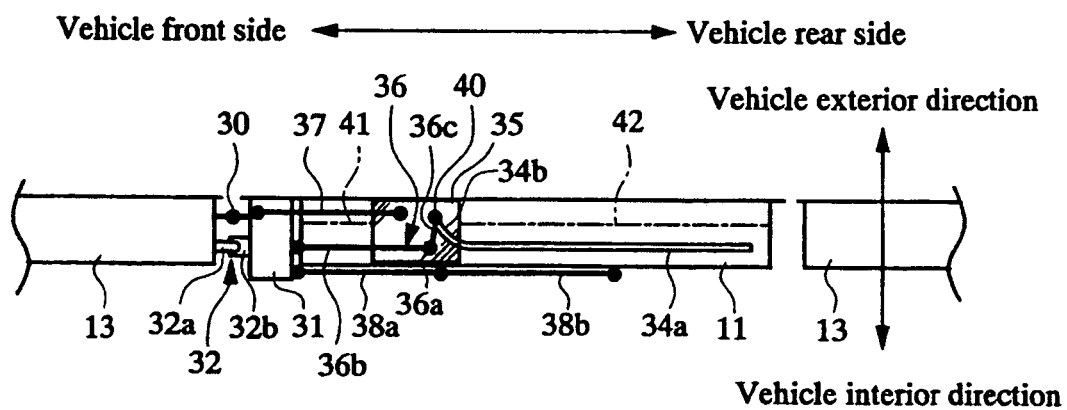
FIGS. 13A and 13B are explanatory views of a front door opening and closing operation, with the structure set to the swing opening and closing structure according to the embodiment.
Figure 13B:
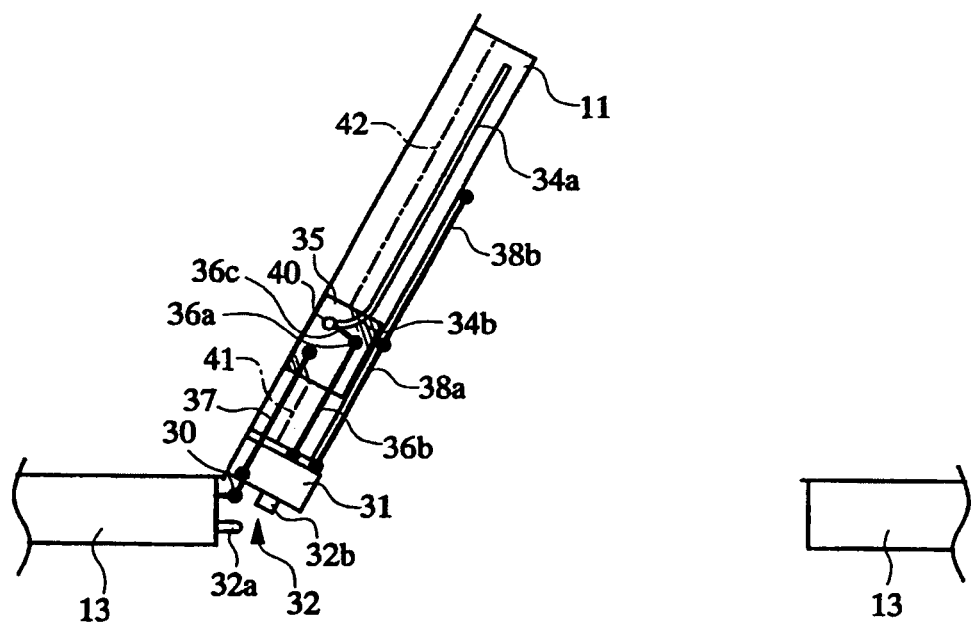

FIGS. 11A to 11C are explanatory views of the opening and closing operation for the front door 11, with the structure set to the slide opening and closing structure. Specifically, FIG. 11A shows a state in which the front door 11 is closed up to a fully closed position, and FIG. 11C shows a state in which the front door 11 is opened up to a fully opened position. FIGS. 12A to 12C are perspective views of the link mechanism 33 set to the slide type in an operating state. Specifically, FIG. 12A shows a state in which the front door 11 is pulled inward in the vehicle interior direction, and FIG. 12C shows a state in which the front door 11 is projected in the vehicle exterior direction. FIGS. 13A and 13B are explanatory views of the opening and closing operation of the front door 11, with the structure set to the swing opening and closing structure. Specifically, FIG. 13A shows a state in which the front door 11 is closed up to the fully closed position, and FIG. 13B shows a state in which the front door 11 is opened up to the fully opened position.

First a state in which the lock mechanism 32 between the vehicle body 13 and the front door 11 is fastened, that is, the opening and closing operation of the front door 11 with the structure set to the slide opening and closing structure will be described. As shown in FIG. 11A, in the state in which the front door 11 is fully closed, the front door 11 is moved in the vehicle rear direction to follow pulling inward of the closing-side cable 41. In addition, the engagement pin 40 of the arm portion 36c is moved to a tip end of the cam groove 34b. If the opening-side cable 42 is pulled inward by driving the slide actuator from this fully opened state, the guide plate 34 integral with the front door 11 is moved in the vehicle front direction as shown in FIGS. 12A to 12C. Accordingly, the control arm 36 attached to the slider 35 is rotated according to the cam groove 34b. In this case, the control arm 36 is rotated with the proximal portion 36a set as a fulcrum. Since the arm portion 36b of the control arm 36 is attached to the vehicle body 13-side base member 31, the control arm 36 is rotated with an end of the arm portion 36b set as a fulcrum while the front door 11 is projected in the vehicle exterior direction as shown in FIGS. 11A and 11B. If the slide actuator is further driven to pull the opening-side cable 42 inward from a half-opened state shown in FIG. 11B, the engagement pin 40 of the arm portion 36c is moved along the linear cam groove 34a as shown in FIG. 11C. Therefore, the front door 11 can be moved to the fully opened position along the side surface of the vehicle body 13. Since the control arm 36 and the driven arm 37 form the parallel link, an angle of the front door 11 is kept constant when the front door 11 is projected. Further, the support arms 38a and 38b that support the weight of the front door 11 follows the opening and closing operation of the front door 11 without hampering the operation.

A state in which the lock mechanism 32 between the vehicle body 13 and the base member 31 is released, that is, the opening and closing operation of the front door 11 with the structure set to the swing opening and closing structure will next be described. As shown in FIG. 13A, in the state in which the front door 11 is fully closed, the lock mechanism 32 is fastened. If the lock mechanism 32 is released from this fully closed state, the vehicle body 13 is connected to the base member 31 only through the hinge member 30. This enables the front door 11 to be rotated with the hinge member 30 set as a fulcrum. Namely, if the front door 11 is swung and moved, then the link mechanism 33 is not actuated, and the front door 11 and the base member 31 are moved integrally with each other. In the embodiment, an instance in which the front door 11 is swung and moved manually is shown. However, the present invention is not limited to this instance. A new actuator may be incorporated between the front door 11 and the base member 31 so that the front door 11 can be automatically opened and closed even if the opening and closing structure is switched over to the swing type.

As can be understood, the opening and closing structure of the front door 11 can exhibit not only the same advantages as those of the opening and closing structure of the rear door 12 but also an advantage in that the opening and closing structure can be switched over between the slide type and the swing type. It is, therefore, possible to deal with various opening and closing states and improve user friendliness.

A lock mechanism, not shown, is provided on each of a front end and a rear end of the front door 11. A lock mechanism, not shown, is provided on a front end of the rear door 12. In the state in which the front door 11 or the rear door 12 is fully closed, these lock mechanisms are fastened.

Figure 14:
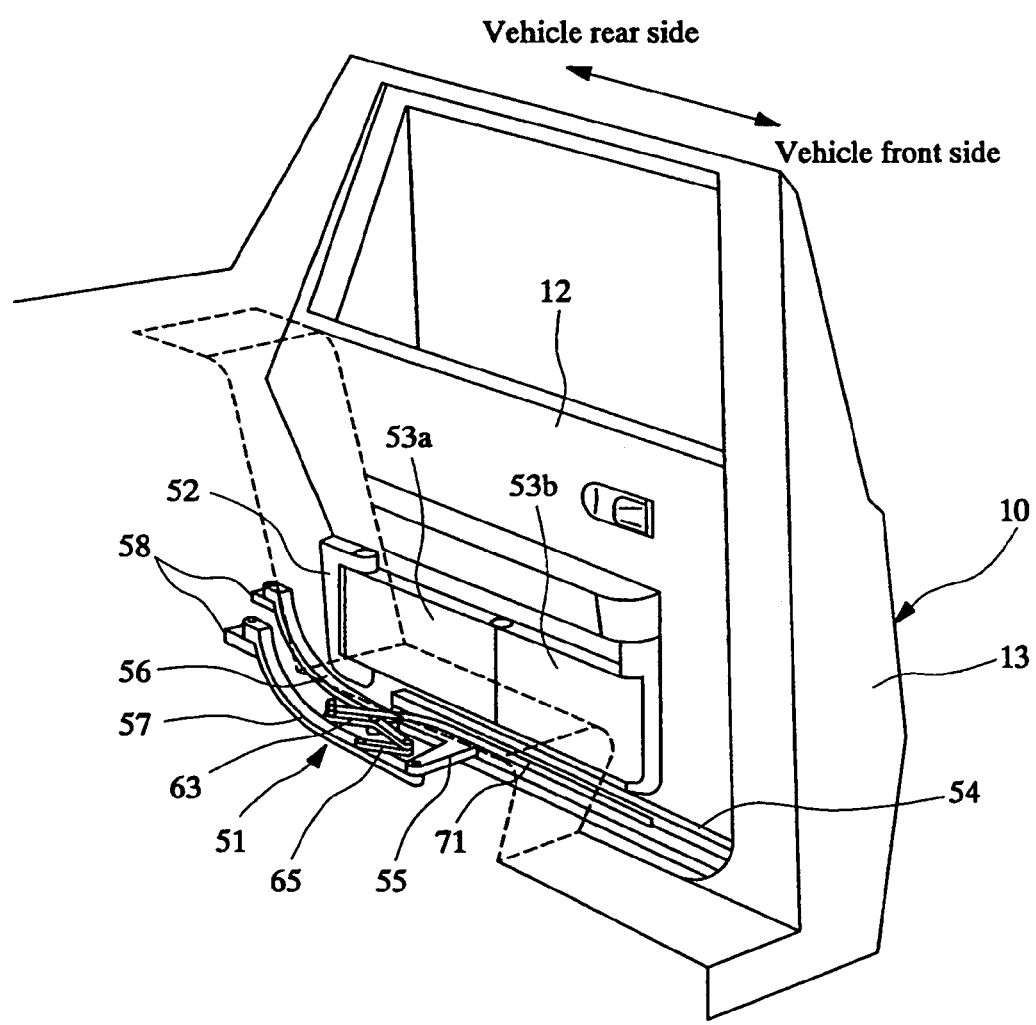
FIG. 14 is a perspective view of a vehicle door opening and closing structure according to another embodiment of the present invention.

FIG. 14 is a perspective view of a vehicle door opening and closing structure according to another embodiment of the present invention.

The vehicle door opening and closing structure (hereinafter, "opening and closing structure") shown in FIG. 14 opens and closes the rear door (door main body) 12 of the vehicle 10. This opening and closing structure includes a link mechanism 51 provided in a lower portion of the rear door 12. The rear door 12 is connected to the vehicle body 13 through this link mechanism 51, and an opening and closing operation of the rear door 12 is controlled by the link mechanism 51 to be slidably opened and closed in the vehicle longitudinal direction. In addition, a support arm 53a is rotatably connected to a support block 52 provided at the vehicle body 13, and a support arm 53b rotatably connected to this support arm 53a is rotatably connected to the rear door 12. The support arms 53a and 53b support a weight of the rear door 12 during the opening and closing operation.

Figure 15:
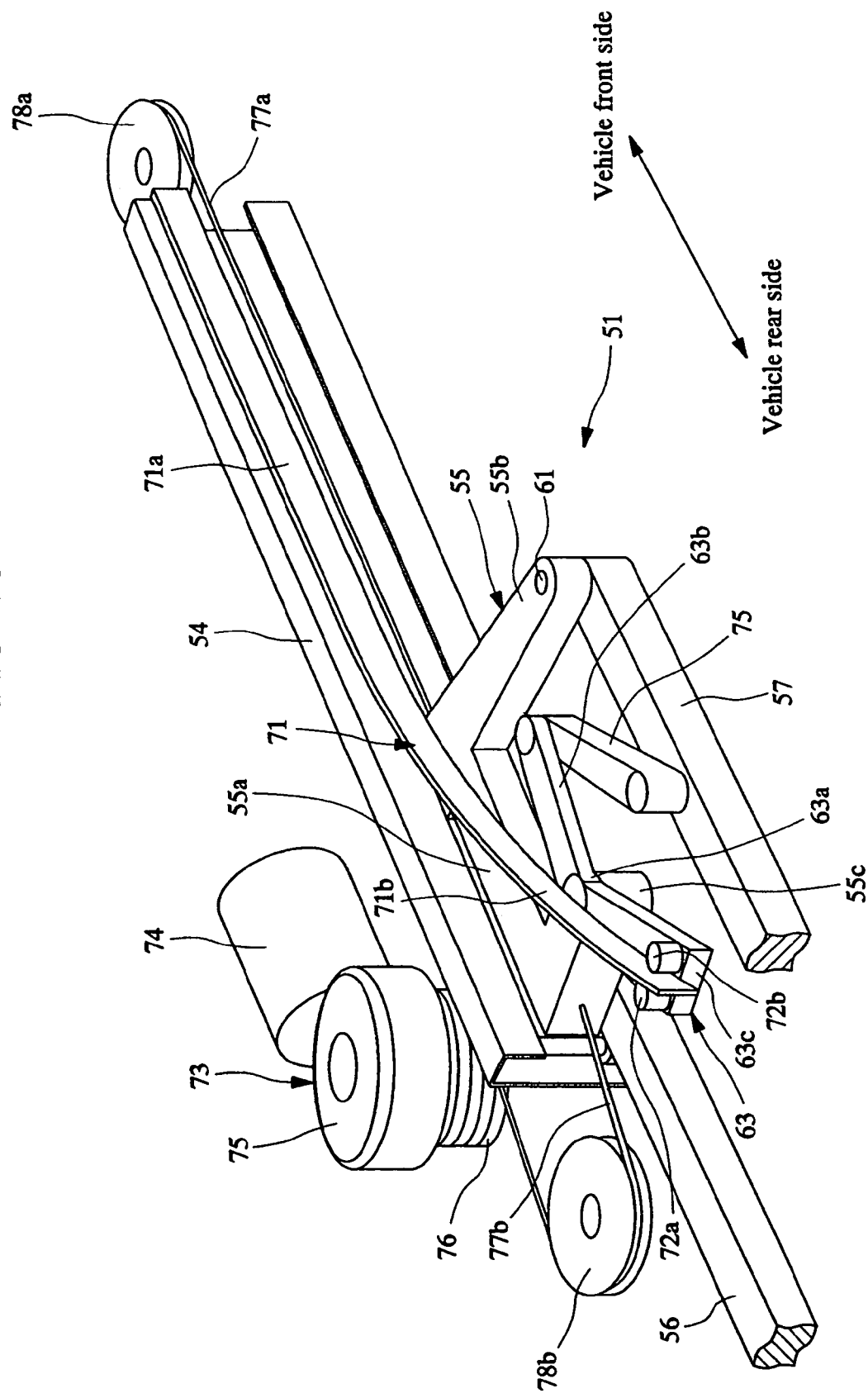
FIG. 15 is a detailed perspective view of a link mechanism shown in FIG. 14.
Figure 16:
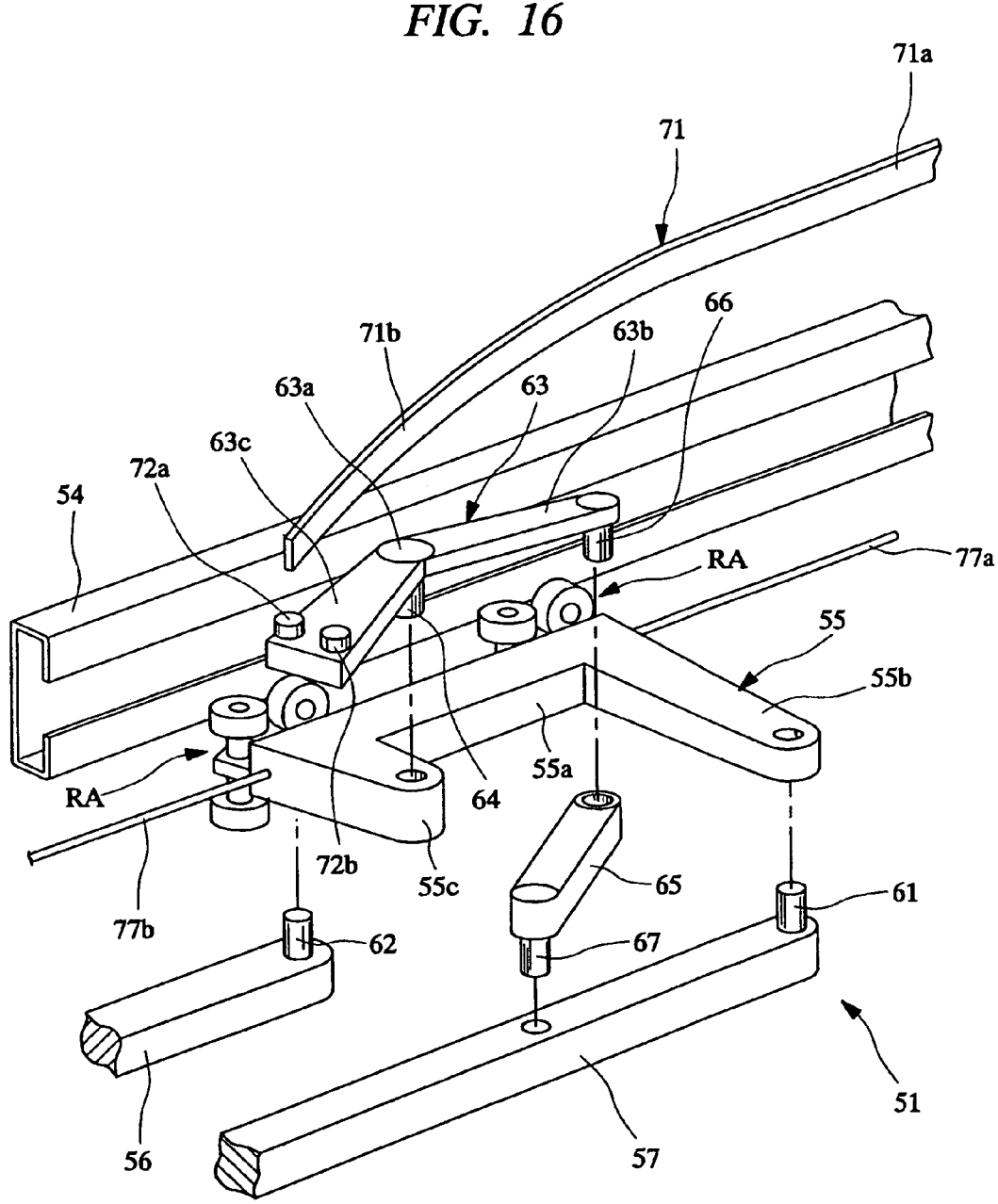
FIG. 16 is an exploded perspective view of the link mechanism shown in FIG. 15.

FIG. 15 is a detailed perspective view of the link mechanism 51 shown in FIG. 14, and FIG. 16 is an exploded perspective view of the link mechanism 51 shown in FIG. 15.

As shown in FIG. 15, this link mechanism 51 includes a slide rail 54 fixed to the lower portion of the rear door 12. The slide rail 54 is formed to extend in the vehicle longitudinal direction, and has a C-shaped cross section. A slider 55 is attached to the slide rail 54. As shown in FIG. 16, the slider 55 includes roller assemblies RA on longitudinal both ends of the slider 55, respectively. By incorporating these roller assemblies RA into the slide rail 54, the slider 55 is made movable along the slide rail 54.

The link mechanism 51 includes a pair of driven arms 56 and 57, and the slider 55 is connected to the vehicle body 13 through these driven arms 56 and 57. As shown in FIG. 14, the driven arms 56 and 57 are formed to be substantially equal in length, and arranged to be aligned in parallel to the vehicle width direction in a state in which the rear door 12 is closed. One end of each of the driven arms 56 and 57 is rotatably connected to a connection block 58 of the vehicle body 13. The slider 55 includes a slider main body 55a and a pair of connected portions 55b and 55c protruding from the slider main body 55a in the vehicle interior direction and different in length. The other end of the vehicle interior-side driven arm 57 is rotatably connected to a tip end of the vehicle front-side longer connected portion 55b by a pin member 61. In addition, the other end of the vehicle exterior-side driven arm 56 is rotatably connected to a tip end of the slider main body 55a at a bottom of the shorter connected portion 55c of the slider 55 by a pin member 62. A length L1 of the longer connected portion 55b is set equal to a length L2 between connected portions of the driven arms 56 and 57 connected to the vehicle body 13 in the vehicle width direction. Thus, the paired driven arms 56 and 57 form a parallel link. By rotating the driven arms 56 and 57, the slider 55 can be swung and moved from a position at which the slider 55 is pulled inward in the vehicle interior direction to a position at which the slider 55 protrudes to an outside of the vehicle 13 while being kept parallel to the rear door 12.

To drive the vehicle interior-side driven arm 57 to move the slide 55 to an inside and the outside of the vehicle body 13, a control arm 63 is connected to the vehicle rear-side connected portion 55c of the slider 55. This control arm 63 includes a proximal portion 63a and a pair of arm portions 63b and 63c continuous to this proximal portion 63a. The proximal portion 63a of the control arm 63 is rotatably connected to a tip end of the shorter connected portion 55c of the slider 55 by a pin 64. A length of the shorter connected portion 55c is set almost half as long as a length of the longer connected portion 55b. The arm portions 63b and 63c are formed so as to be substantially equal in length, and so that protruding directions of the arm portions 63b and 63c in which the arm portions 63b and 63c protrude from the proximal portion 63a are deviated from each other in a rotation direction of the pin member 64. By forming so, the control arm 63 is doglegged relative to an axial direction of the pin member 64.

To transmit a rotation operation of the control arm 63 to the driven arm 57, a sub control arm 65 is connected between the control arm 63 and the driven arm 57. One end of the sub control arm 65 is rotatably connected to a tip end of the arm portion 63b of the control arm 63 by a pin member 66. In addition, the other end of the sub control arm 65 is rotatably connected to an intermediate portion of the vehicle interior-side driven arm 57 by a pin member 67.

By forming so, the slider 55 is connected to the vehicle interior-side driven arm 57 by the control arm 63 and the sub control arm 65. In a state in which the rear door 12 is closed, an angle formed between the arm portion 63b of the control arm 63 and the sub control arm 65 is set to an acute angle. If the control arm 63 is rotated in a direction in which the arm portion 63b is closer to the sub control arm 65 from this state, the angle between the arm portion 63b and the sub control arm 65 is wider. Therefore, by rotating the control arm 63 in the direction in which the arm portion 63b is closer to the sub control arm 65, the driven arm 57 is rotated about the connected portion 55b in the vehicle interior direction, i.e., rotated about the connection block 58 in the vehicle exterior direction and the slider 55 can be pulled outside of the vehicle body 13. Since the driven arm 57 and the other driven arm 56 form the parallel link, the slider 55 is pulled outside while being kept parallel to the rear door 12.

A guide rail 71 serving as a guide member is fixed to the rear door 12 so as to rotate the control arm 63 according to a movement of the slider 55 along the side rail 54. This guide rail 71 is formed into a J shape to include a linear portion 71a extending in the vehicle longitudinal direction and a curved portion 71b continuous to the linear portion 71a. In this embodiment the curved portion 71b is formed to be arranged on the vehicle rear side which is an opened side of the rear door 12 in the slidably moving direction and to be curved in the vehicle interior direction.

A pair of guide rollers 72a and 72b are provided on a tip end of the vehicle rear-side arm portion 63c of the control arm 63. By holding the guide rail 71 between the guide rollers 72a and 72b, the arm portion 63c of the control arm 63 is movably engaged with the guide rail 71. Accordingly, if the slider 55 is moved along the slide rail 54, then the guide rollers 72a and 72b are moved along the guide rail 71, and the rotation of the control arm 63 relative to the slider 55 is controlled.

As shown in FIG. 15, a slide actuator 73 serving as a driving unit that drives the slider 55 along the slide rail 54 is fixed to the rear door 12. This slide actuator 73 includes an electric motor 74 serving as a drive source of the actuator 73 and a decelerator 75 that decelerates a rotation speed of the electric motor 74 to a predetermined rotation speed, and that outputs the decelerated rotation speed. A drum 76 is fixed to an output shaft (not shown) of the decelerator 75. A opening-side cable 77a and a closing-side cable 77b are wound around an outer circumference of the drum 75 by a plurality of turns in the same direction. The opening-side cable 77a is connected to the slider 55 from the vehicle front side, with a moving direction of the cable 77a inverted by a reverse pulley 78a provided on a vehicle front-side end of the slide rail 54. The closing-side cable 77b is connected to the slider 55 from the vehicle rear side, with a moving direction of the cable 77b inverted by a reverse pulley 78b provided on a vehicle rear-side end of the slide rail 54. Therefore, by actuating the slide actuator 73 in an opening direction, the opening-side cable 77a can be wound around the drum 76, and the slider 55 can be moved relative to the rear door 12 in the vehicle front direction. Conversely, by actuating the slide actuator 73 in a closing direction, the closing-side cable 77b can be wound around the drum 76, and the slider 55 can be moved relative to the rear door 12 in the vehicle rear direction.

A control unit (not shown) including a CPU and a memory is connected to the slide actuator 73. Therefore, the control unit executes a current-carrying control over the electric motor 74 in response to an operation signal from a opening-closing switch (not shown) provided at for example, the driver's seat or the rear seat FIGS. 17A to 17D are explanatory views of the rear door opening and closing operation. FIGS. 18A to 18C are perspective views of the link mechanism 51 in an operating state when the rear door 12 is pulled outside of the vehicle. FIGS. 19A to 19C are perspective views of the rear door 12, showing the rear door opening and closing operation from the vehicle interior side.

The opening and closing operation for the rear door 12 by the opening and closing structure according to this embodiment will be described with reference to FIGS. 17A to 17D to FIGS. 19A to 19D.

Figure 17A:
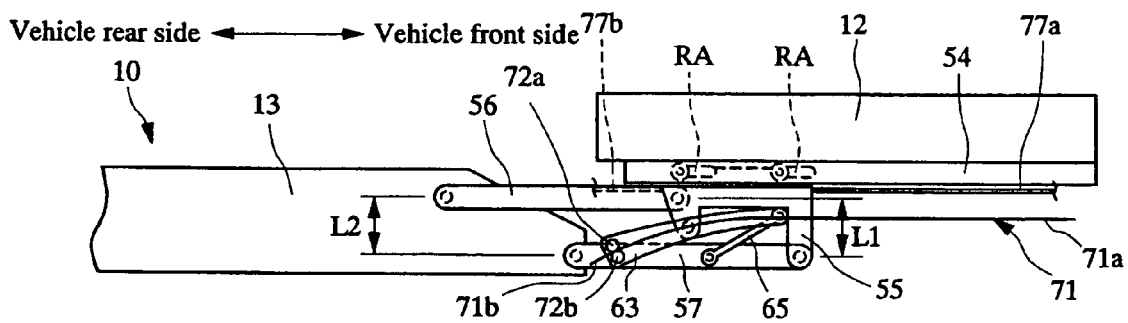
FIGS. 17A to 17D are explanatory views of a rear door opening and closing operation according to the embodiment shown in FIG. 14.
Figure 17B:
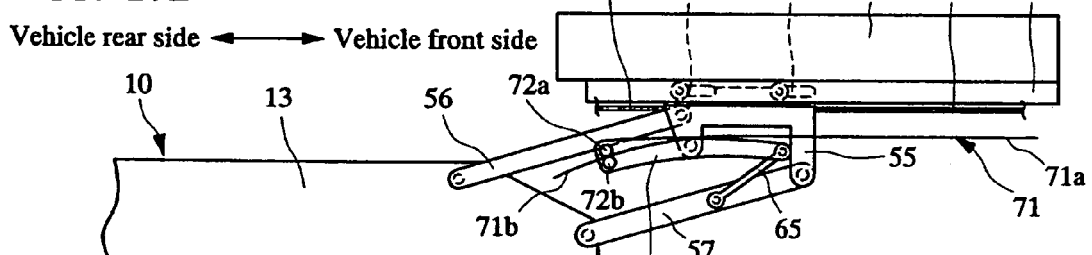
Figure 17C:
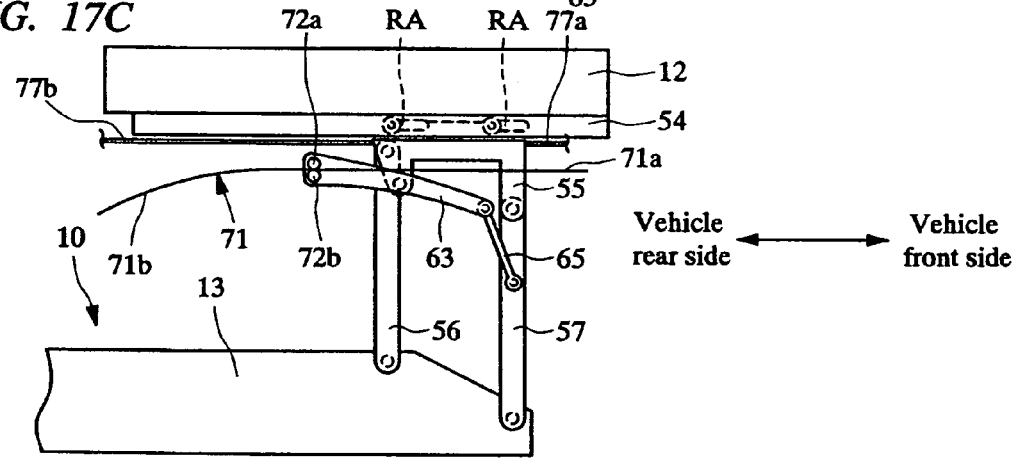
Figure 18A:
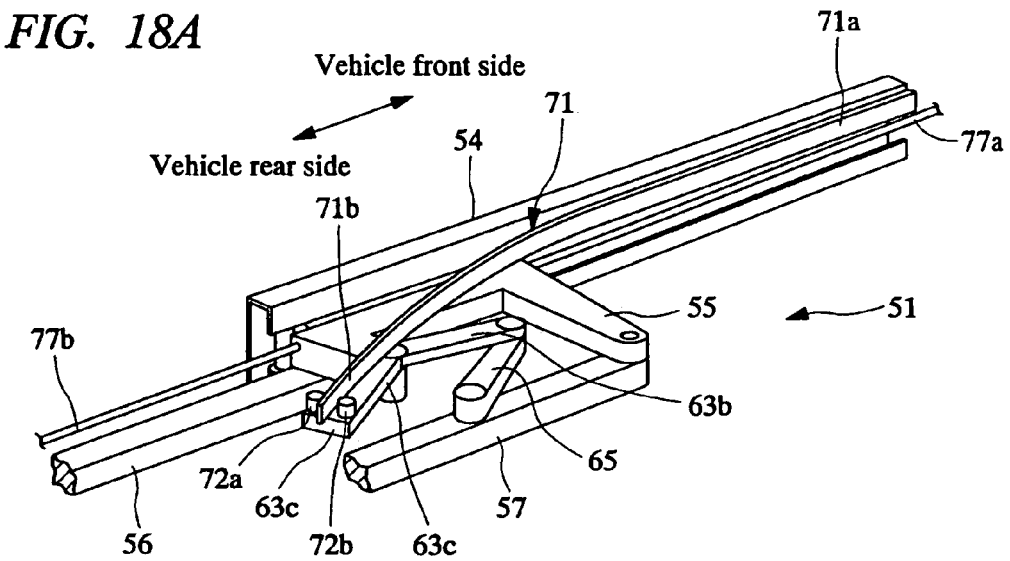
FIGS. 18A to 18C are perspective views of the link mechanism in an operating state of the link mechanism when the rear door is pulled to a vehicle exterior side according to the embodiment shown in FIG. 14.
Figure 18B:
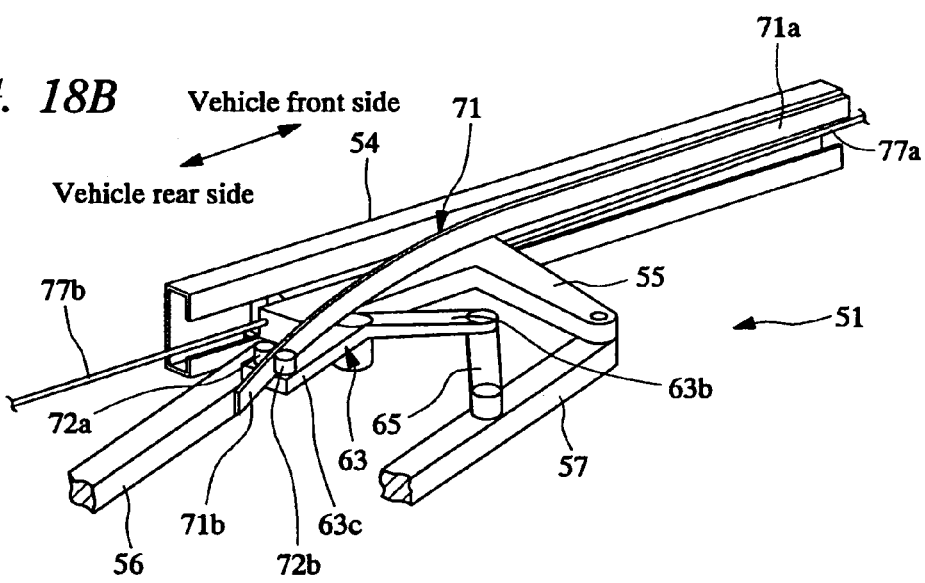
Figure 18C:
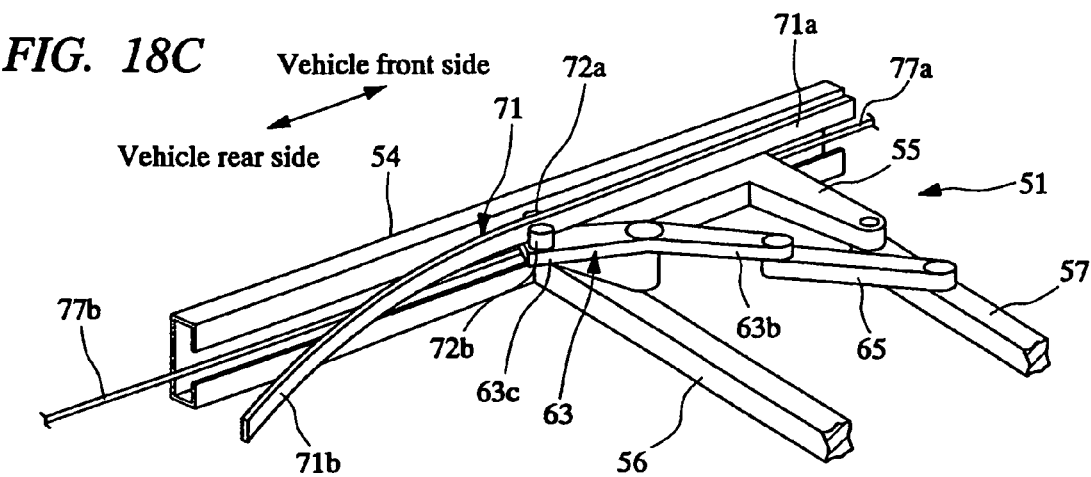
Figure 19A:
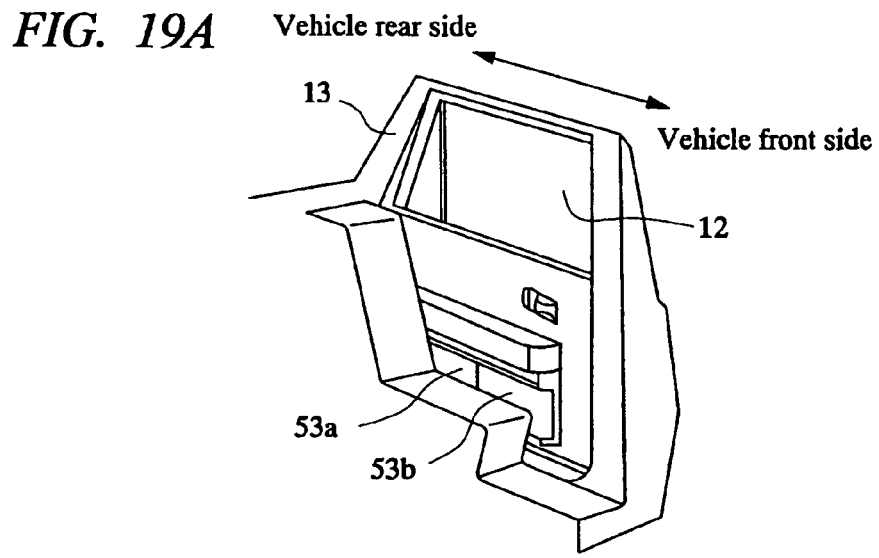
FIGS. 19A to 19C are perspective views of the rear door, showing the rear door opening and closing operation from a vehicle interior side according to the embodiment shown in FIG. 14.
Figure 19B:
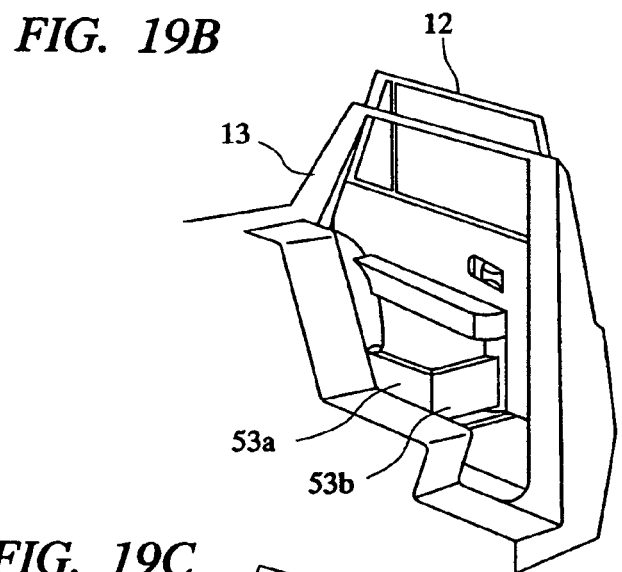
Figure 19C:
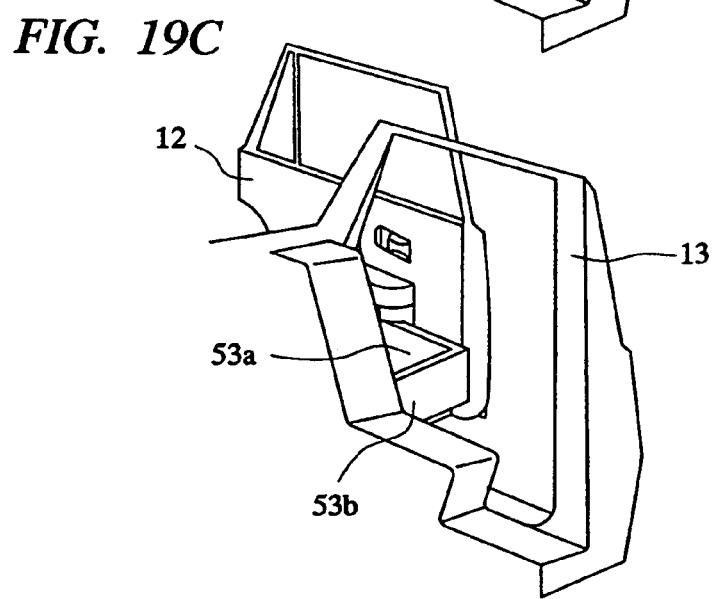

As shown in FIGS. 17A, 18A, and 19A, in the state in which the rear door 12 is fully closed, the slider 55 is located on a vehicle rear-side stroke end of the slide rail 54. In addition, each of the guide rollers 72a and 72b of the control arm 63 is located on a tip end of the curved portion 71b of the guide rail 71. If the slide actuator 73 is actuated in the opening direction from this fully closed state, then the slider 55 is moved relative to the rear door 12 in the vehicle front direction to follow the opening-side cable 77a, and the guide rollers 72a and 72b of the control arm 63 are moved along the curved portion 71b as shown in FIGS. 17B and 18B. The control arm 63 is thereby rotated clockwise in FIG. 17B. If the control arm 63 is rotated, then the angle between the arm portion 63b of the control arm 63 and the sub control arm 65 is wider, and the driven arms 56 and 57 are rotated about the control block 58 in the vehicle exterior direction. If the slider 55 is moved to a position at which the guide rollers 72a and 72b arrive at the linear portion 71a from the curved portion 71b, the driven arms 56 and 57 are located at a right angle with respect to the vehicle longitudinal direction as shown in FIGS. 17C, 18C, and 19B. The slider 55, that is, the rear door 12 is thereby pulled outward to a predetermined position outside of the vehicle body 13 while the rear door 12 is kept parallel to the vehicle body 13, and projected outward of the vehicle body 13 from the side surface of the vehicle body 13.

Figure 17D:
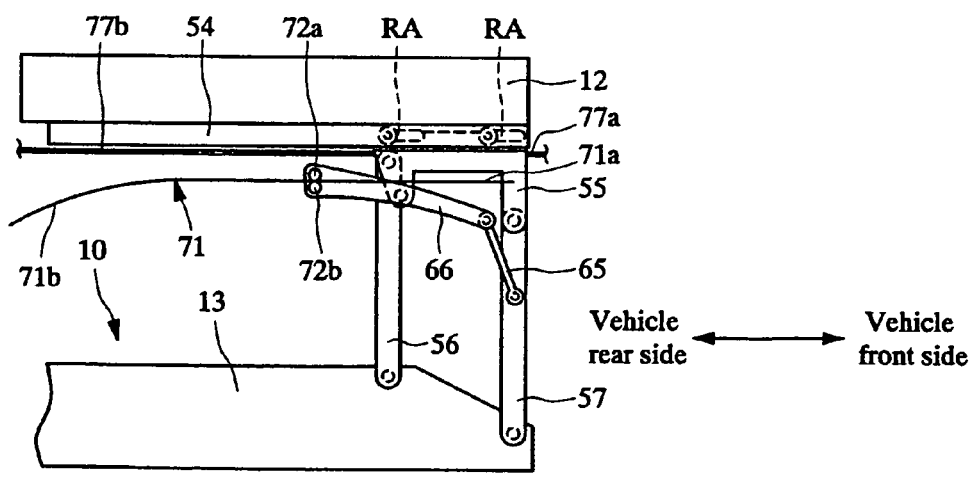

After the rear door 12 is projected to the predetermined position outside of the vehicle body 13, the guide rollers 72a and 72b are guided by the linear portion 71a of the guide rail 71. The rotation of the control arm 63 is thereby stopped, in which state the slider 55 is moved along the slide rail 54. As a result the operation of the rear door 12 is changed from a swing operation to a slide operation. As shown in FIGS. 17D and 19C, the rear door 12 is slidably moved up to the fully opened position along the side surface of the vehicle body 13 in the vehicle rear direction while being kept projected outside of the vehicle 13.

As shown in FIGS. 19A to 19C, the support arms 53a and 53b that support the weight of the rear door 12 follow the opening and closing operation for the rear door 12 without hampering the operation.

As can be understood, this opening and closing structure can smoothly open the rear door 12 from the fully closed position to the fully opened position by causing the slide actuator 73 to pull inward the opening-side cable 77a. Conversely, the opening and closing structure can smoothly close the rear door 12 from the fully opened position to the fully closed position as shown in FIGS. 17D, 17C, 17B, and 17A in this order by actuating the slide actuator 73 in the closing direction to pull up the closing-side cable 77b. By thus adopting the opening and closing structure according to the embodiment of the present invention, the opening and closing operation for the rear door 12 can be continuously performed without intermissions. Therefore, the operativity of the rear door 12 during the opening and closing operation can be improved, and the vehicle quality can be enhanced. In addition, only by moving the slider 55 and the rear door 12 relative to each other, the rear door 12 can be opened and closed. Therefore, the opening and closing operation can be automated by the single slide actuator 73 without the need to provide a plurality of actuators and a complicated power transmission mechanism. This can thereby facilitate automating the opening and closing operation for the rear door 12.

Figure 20A:
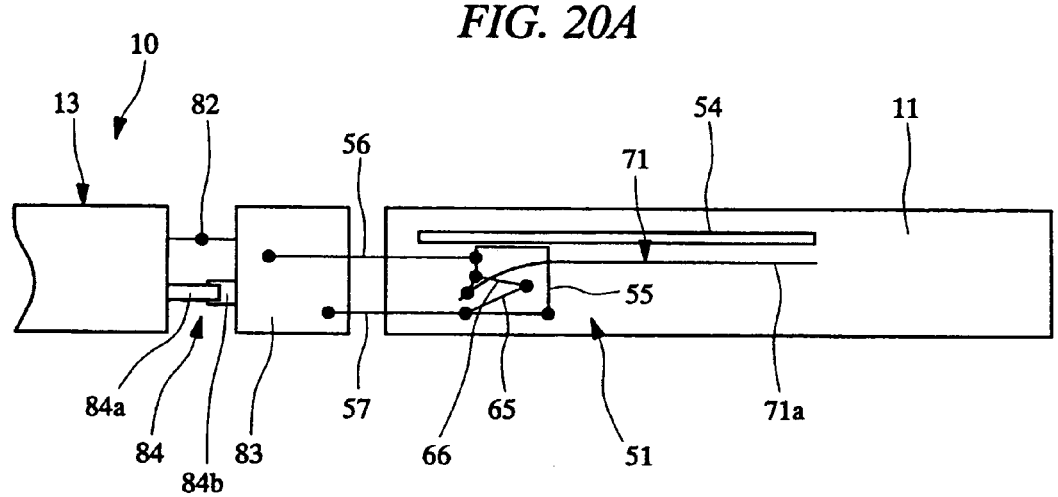
FIG. 20A is a schematic explanatory view of a vehicle door opening and closing structure according to another embodiment of the present invention.
Figure 20B:
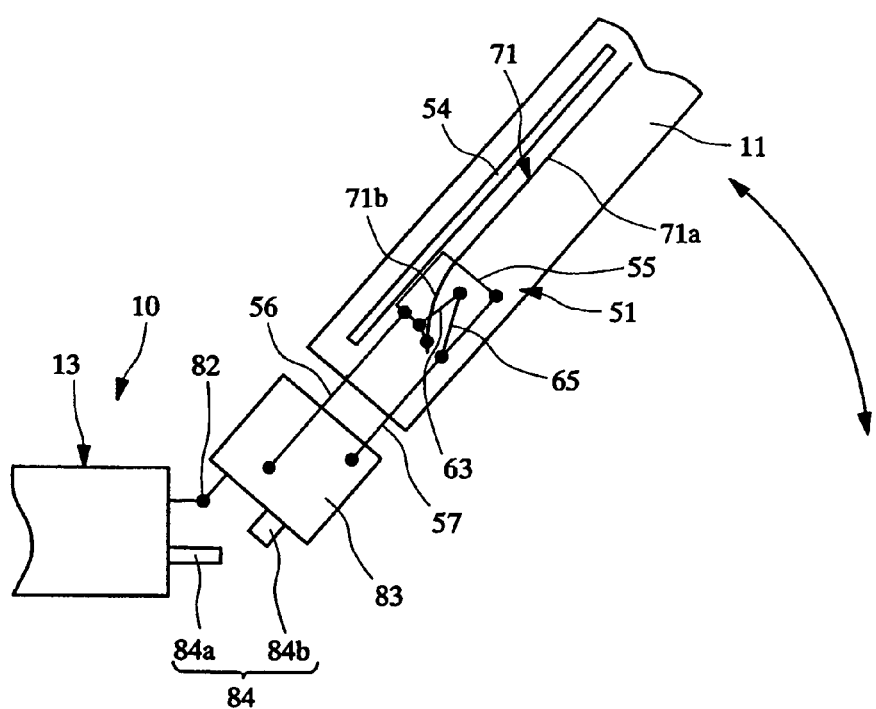
FIG. 20B is an explanatory view of a front door in a state in which the front door is opened by a swing opening and closing operation according to the embodiment shown in FIG. 20A.

FIG. 20A is a schematic explanatory view of a vehicle front door opening and closing structure according to another embodiment of the present invention. FIG. 20B is an explanatory view of a state in which the front door is swung and opened. In FIGS. 20A and 20B, elements corresponding to those already described above are denoted by the same reference symbols.

The vehicle door opening and closing structure (hereinafter, "opening and closing structure") shown in FIGS. 20A and 20B opens and closes the front door 11 of the vehicle 10. This opening and closing structure can be switched over between the slide type for slidably moving the front door 11 in the vehicle front direction and the swing type for rotating the front door 11 with a front end of the front door 11 set as a fulcrum.

As shown in FIG. 20A, a base member 83 is attached to the vehicle body 13 through a hinge member 82. A lock mechanism 84 is provided between the vehicle body 13 and the base member 83. The lock mechanism 84 includes a striker 84a provided at the vehicle body 13 and a lock assembly 84b provided at the base member 83. By mating the lock assembly 84b with the striker 84a, the vehicle body 13 and the base member 83 can be integrally fixed to each other.

The front door 11 is connected to the base member 83 through a pair of driven arms 56 and 57, i.e., the link mechanism 51 similarly to the opening and closing structure for the rear door 12. Similarly to the rear door 12, the front door 11 can be slidably opened and closed relative to the base member 83.

The guide rail 71 serving as the guide member is fixed to the front door 11 so as to rotate the control arm 63 according to a movement of the slider 55 along the slide rail 54. This guide rail 71 is formed into a generally J shape to include the linear portion 71a extending in the vehicle longitudinal direction and the curved portion 71b continuous to the linear portion 71a. In this embodiment, the curved portion 71b is formed to be arranged on the vehicle front side which is an opened side of the front door 11 relative to the linear portion 71a and to be curved in the vehicle interior direction.

An opening and closing operation for the front door 11 will next be described.

As already stated, the opening and closing structure for the front door 11 can be switched over between the slide type and the swing type. This switchover is controlled by the lock mechanism 84 provided between the vehicle body 13 and the base member 83. Namely, the opening and closing structure is set to the slide opening and closing structure by switching over a state of the lock mechanism 84 to a fastened state, thereby setting the opening and closing structure to the slide type. Similarly to the opening and closing structure for the rear door 12, if the opening and closing structure is set to the slide type, the driven arms 56 and 57 are rotated relative to the base member 83, thereby pulling the front door 11 outside of the vehicle body 13. In this state, the slider 55 is moved along the slide rail 54, whereby the front door 11 is slidably moved in the vehicle front direction along the side surface of the vehicle body 13 and closed and opened.

If the lock mechanism 84 is released, the base member 83 is separated from the vehicle body 13, thereby setting the opening and closing structure to the swing type. In the state in which the opening and closing structure is set to the swing type, if the front door 11 is fully closed as shown in FIG. 20A, the lock mechanism 84 is fastened. If the lock mechanism 84 is released from this fully closed state, the vehicle body 13 is connected to the base member 83 only through the hinge member 82. This enables the front door 11 to be rotated with the hinge member 82 set as a fulcrum. Namely, if the front door 11 is swung and moved, then the link mechanism 51 is not actuated, and the front door 11 and the base member 83 are moved integrally with each other. Alternatively, a lock mechanism for locking the link mechanism 51 (integrating the front door 11 with the base member 83) may be provided so as to prevent the link mechanism 51 from being inadvertently moved during this swing operation. In the embodiment an instance in which the front door 11 is swung and moved manually is shown. However, the present invention is not limited to this instance. Another driving unit may be incorporated between the front door 11 and the base member 83 so that the front door 11 can be automatically opened and closed even if the opening and closing structure is switched over to the swing type.

As can be understood, the opening and closing structure for the front door 11 can exhibit not only the same advantages as those of the opening and closing structure for the rear door 12 but also an advantage in that the opening and closing structure can be switched over between the slide type and the swing type. It is, therefore, possible to deal with various opening and closing states and improve user friendliness.

Needless to say, the present invention is not limited to the embodiments stated so far but can be variously changed within the scope of the invention. For instance, in the embodiments, by providing the slide actuator 23 or 73, the front door 11 or the rear door 12 is automatically opened and closed. However, the present invention is not limited thereto. Each of the opening and closing structures according to the present invention may be applied to a vehicle having the front door 11 or the rear door 12 opened and closed manually. Alternatively, by incorporating a clutch mechanism that cuts off a motor power supplied to the slide actuator 23 or 73, the opening and closing structure may be switched over between an automatic mode for opening and closing the rear door 12 using the motor power and a manual mode for cutting off the motor power and manually opening and closing the rear door 12.

In the embodiments, the slider actuator 23 or 73 is configured so that the cables 24 and 25 or 77a and 77b fixed to the slider 17 or 55 are wound around the drum 26 or 76, thereby moving the slider 17 or 55 and the rear door 12 relative to each other. However, the present invention is not limited thereto. An actuator configured so that a ball screw is rotated, thereby moving the slider 17 or 55 and the rear door 12 relative to each other along the ball screw may be adopted.

In the embodiments, as the guide member that rotates the control arm 36 or 63, the guide plate 16 or 34 in which the generally J-shaped cam grooves 16a and 16b or 34a and 34b are formed or the plate-like guide rail 71 is employed. In addition, the engagement pin 22 or 40 engaged with the cam grooves 16a and 16b or 34a and 34b or the paired guide rollers 72a and 72b between which the guide rail 71 is held are provided in the control arm 36 or 63. However, the present invention is not limited thereto. The other structure may be adopted as the guide member as long as the control arm 36 or 63 is rotated by moving the arm portion 18c, 36c or 33c along the guide member.

In the opening and closing structures according to the embodiments, the link mechanism 15 or 51 is provided in the lower portion of the door main body. However, the present invention is not limited thereto. The link mechanism may be provided in a vertically intermediate position of the door main body as long the link mechanism does not interfere with the support arms 20a and 20b or 53a and 53b at the intermediate position in view of arrangement and magnitudes of the support arms 20a and 20b or 53a and 53b.

Further, the opening and closing structure in which the base member 31 or 83 is provided between the front door 11 and the vehicle body 13 so as to switch over the structure for the door main body between the slide type and the swing type may be applied to the rear door 12. In this case, a swing opening and closing operation for the rear door 12 is performed so that the rear door 12 is rotated with a rear end of the rear door 12 (an opened side in the slidable moving direction) set as a fulcrum.

What is claimed is:

1. A vehicle door opening and closing structure for opening and closing a door main body attached to an opening of a vehicle body, comprising:
    a slide rail fixed to the door main body;
    a slider attached to the slide rail to be movable along the slide rail;
    a control arm including a proximal portion rotatably connected to the slider and a pair of arm portions continuous to the proximal portion;
    a driven arm having one end rotatably connected to the vehicle body and having the other end rotatably connected to the slider; and
    a guide member including a linear portion and a curved portion continuous to the linear portion, the guide member fixed to the door main body side where the slider is movably disposed and movably engaged with one of the arm portions of the control arm, wherein
    the other arm portion of the control arm is rotatably connected to the vehicle body side; and
    the control arm is rotated because of one of the arm portions being guided by the curved portion by moving the slider along the slide rail under the fully closed condition of the door and the door main body is pulled outside of the vehicle body by the other arm portion of the control arm, and then the slider is moved along the slide rail, thereby slidably opening and closing the door main body.

2. The vehicle door opening and closing structure according to claim 1, wherein the other arm portion of the control arm and the driven arm are arranged in parallel to each other.

3. The vehicle door opening and closing structure according to claim 1, wherein the other arm portion of the control arm is longer than the arm portion movably engaged with the guide member.

4. The vehicle door opening and closing structure according to claim 1, further comprising:
    a base member connected to the vehicle body through a hinge member, and connected to the door main body through the driven arm; and
    a lock mechanism provided between the vehicle body and the base member, and switched over between a fastened state in which the base member is fixed to the vehicle body and a released state in which the base member is separated from the vehicle body, wherein
    the door main body is slidably moved along a side surface of the vehicle body by fastening the lock mechanism to thereby fix the base member to the vehicle body, and the door main body is swung and moved with the hinge member set as a fulcrum by releasing the lock mechanism to thereby separate the base member from the vehicle body.

5. The vehicle door opening and closing structure according to claim 4, wherein the base member is connected to the door main body through the control arm and the driven arm.

6. The vehicle door opening and closing structure according to claim 1, further comprising a sub control arm rotatably connected to the other arm portion of the control arm, and rotatably connected to an intermediate portion of the driven arm.

7. The vehicle door opening and closing structure according to claim 6, wherein the driven arm is a pair of driven arms.

8. The vehicle door opening and closing structure according to claim 6, wherein the pair of arm portions are formed to be substantially equal in length, and the control arm is formed into a doglegged shape.

9. The vehicle door opening and closing structure according to claim 6, further comprising:
    a base member connected to the vehicle body through a hinge member, and connected to the door main body through the driven arm; and
    a lock mechanism provided between the vehicle body and the base member, and switched over between a fastened state in which the base member is fixed to the vehicle body and a released state in which the base member is separated from the vehicle body, wherein
    the door main body is slidably moved along a side surface of the vehicle body by fastening the lock mechanism to thereby fix the base member to the vehicle body, and the door main body is swung and moved with the hinge member set as a fulcrum by releasing the lock mechanism to thereby separate the base member from the vehicle body.

10. The vehicle door opening and closing structure according to claim 9, wherein the base member is connected to the door main body through a pair of the driven arms.

11. The vehicle door opening and closing structure according to claim 1, wherein the slider is driven by driving means fixed to the door main body.

12. The vehicle door opening and closing structure according to claim 1, wherein the curved portion of the guide member is curved in a vehicle exterior direction or a vehicle interior direction on an opened side of the door main body in a slidably moving direction of the door main body.

13. The vehicle door opening and closing structure according to claim 1, wherein the vehicle door is a front door.

14. The vehicle door opening and closing structure according to claim 1, wherein the vehicle door is a rear door.

* * * * *